(12) United States Patent
Rigaldies et al.

(10) Patent No.: US 6,792,085 B1
(45) Date of Patent: Sep. 14, 2004

(54) SYSTEM AND METHOD FOR UNIFIED MESSAGING WITH MESSAGE REPLICATION AND SYNCHRONIZATION

(75) Inventors: Bertrand Rigaldies, Earlysville, VA (US); Greg Bedlek, Sarasota, FL (US); Eoin Heaney, Nokomis, FL (US); Jonathan Ringle, Sarasota, FL (US); Ryan Smith, Palmetto, FL (US)

(73) Assignee: Comdial Corporation, Charlottesville, VA (US)

( * ) Notice: Subject to any disclaimer, the term of this patent is extended or adjusted under 35 U.S.C. 154(b) by 0 days.

(21) Appl. No.: 09/394,563

(22) Filed: Sep. 10, 1999

(51) Int. Cl.[7] .......................... H04M 1/00; G06F 15/16
(52) U.S. Cl. ............... 379/88.13; 379/88.22; 379/100.08; 379/93.24; 379/88.25; 709/206; 709/248
(58) Field of Search .................... 379/88.15, 88.16, 379/67.1, 88.13, 88.18, 88.17, 88.22, 88.25, 68, 88.27, 100.08, 93.01, 93.24, 93.17; 709/206, 248

(56) References Cited

U.S. PATENT DOCUMENTS

| | | | |
|---|---|---|---|
| 4,790,003 A | 12/1988 | Kepley et al. | 379/88.18 |
| 4,797,672 A | 1/1989 | Kousa | 340/5.26 |
| 4,837,798 A | 6/1989 | Cohen et al. | 379/88 |
| 5,155,772 A | 10/1992 | Brandman et al. | 704/203 |
| 5,333,266 A * | 7/1994 | Boaz et al. | 709/206 |
| 5,479,411 A | 12/1995 | Klein | 370/110.1 |
| 5,557,659 A | 9/1996 | Hyde-Thomson | 379/88.13 |
| 5,572,578 A | 11/1996 | Lin et al. | 379/88.18 |
| 5,608,786 A | 3/1997 | Gordon | 379/100 |
| 5,633,916 A | 5/1997 | Goldhagen et al. | 379/67 |
| 5,647,002 A | 7/1997 | Brunson | 380/49 |
| 5,717,742 A | 2/1998 | Hyde-Thomson | 379/88 |
| 5,737,395 A | 4/1998 | Irribarren | 379/88 |
| 5,754,636 A | 5/1998 | Bayless et al. | 379/142 |
| 6,018,762 A * | 1/2000 | Brunson et al. | 709/206 |
| 6,233,318 B1 * | 5/2001 | Picard et al. | 379/88.17 |
| 2002/0159575 A1 * | 10/2002 | Skladman et al. | 379/93.24 |

* cited by examiner

Primary Examiner—Fan Tsang
Assistant Examiner—Ovidio Escalante
(74) Attorney, Agent, or Firm—Holland & Knight LLP

(57) ABSTRACT

A unified messaging system is provided that includes two-way synchronization and replication of messages. The unified messaging system includes a workstation, a voice-mail server, and an e-mail server. The workstation may be a personal computer, for example. The workstation includes an agent to monitor messaging activities within the workstation mailbox. Also, the voice-mail server includes a proxy e-mail client (PEC) to operate and retrieve e-mail messages in the absence of the workstation. In accordance with the system and method of the invention, two-way synchronization and replication is provided. The two-way synchronization and replication operates between the workstation and the voice-mail server. Specifically, the replication operates between the e-mail store, e.g., the mailbox, of the workstation and the voice-mail store of the voice-mail server. The replication duplicates messages in each of the mailbox of the workstation and the voice-mail message store of the voice-mail server. Thus, the voice-mail message store contains both the voice-mail and the e-mail. Further, the e-mail message store contains both the e-mail and the voice-mail.

36 Claims, 25 Drawing Sheets

SYSTEM AND METHOD FOR UNIFIED MESSAGING WITH MESSAGE REPLICATION AND SYNCHRONIZATION

BACKGROUND OF THE INVENTION

1. Field of the Invention

The present invention relates broadly to systems and methods for unified messaging involving a voice-mail system and an e-mail system.

2. Background of the Invention

Effective communication between persons continues to be important to both businesses and private individuals. Two types of communication are in common use. The first type of communication is the long established telephone, which uses the public telephone system or other wiring system in conjunction with a telephone set. The second type of communication in common use today is e-mail.

A document characterized as an electronic mail, i.e., an e-mail or e-mail message, is created by a user on a personal computer, for example, and forwarded across a data network to the recipient. The recipient retrieves the e-mail using a suitable service provider and may then view the received e-mail at some later time.

Alternatively, voice-mail systems allow callers, both internal and external to a particular establishment, to leave voice recordings of memoranda or short messages that can be accessed at a later time by a recipient. Each telephone set associated with a voice-mail system will have a designated message location, known commonly as a "voice mailbox." If a caller accesses a voice mailbox associated with a given telephone set, a voice recording may be stored for selective retrieval by user at a later time. This process of using the telephone may be characterized as voice messaging.

E-mail messaging and voice-mail messaging operate in distinct environments using different technologies. The distinctness of the environments have been a result of the nature of the technology, the vendors involved who distribute and promote the technology, and the types of services traditionally offered by each of e-mail messaging and voice-mail messaging, using the telephone.

The concept of "unified messaging" is to create an operating environment in which the user believes that he or she is dealing with a single environment, as opposed to the traditional two environments of voice-mail and e-mail.

There are various known systems directed at unified messaging systems. Illustratively, U.S. Pat. No. 5,717,742 (hereinafter the 742 patent) to Hyde-Thomson discloses an electronic mail system having integrated voice messages. The 742 patent discloses a system in which a voice message is converted into a digital voice file, which is stored in the shared memory device corresponding to the intended recipient's mailbox. Thereby, one mailbox can contain both voice and text messages. The 742 patent further discloses that the same message handling mechanism is used for handling both voice and text messages.

U.S. Pat. No. 5,647,002 to Brunson (hereinafter the 002 patent) discloses a system in which synchronization of mailboxes of different types is performed. The 002 patent teaches that one messaging system may be an e-mail system and the other messaging system may be a voice-mail system. The synchronization enables the mailbox user/owner to depend on either system to notify him or her of the arrival of any message in both systems. The 002 patent further discloses that the user may retrieve all messages from either system and do so in an identical manner, or may retrieve some messages from one system and other messages from the other system irrespective of which system the message originated on. The user may also determine the correct status of all messages from examining the system. The 002 patent describes that a scanning process is performed to analyze the contents of the mailbox. Illustratively, the 002 patent describes that a processor checks the contents of message ID fields, of all entries of a table, against stored information to see if any message IDs that appear in the table do not appear in the mailbox.

U.S. Pat. No. 5,333,266 to Boaz et al. (hereinafter the 266 patent) discloses a method and apparatus for message handling in computer systems. The 266 patent teaches an integrated messaging system (IMS) which integrates mail from a plurality of mail servers handling messages of different media types such as text, voice, facsimile, video and image. The IMS maintains the in-basket for all mail systems, eliminating the need to collect each type of mail separately. The 266 patent further discloses that the IMS also includes synchronization means which checks to see whether the mail count in each in-basket is the same to guarantee that the same mail items are in each file server in-basket. The 266 patent describes that the IMS comprises a plurality of file servers each coupled to a plurality of workstations. Each file server includes a message store for the messages of the media type which it handles, as well as a message pointer store which serves as an in-basket. Accordingly, the 266 patent relies on the use of pointers.

U.S. Pat. No. 4,837,798 to Cohen et al. (hereinafter the 798 patent) discloses a communication system having unified messaging. The 798 patent describes that unified messaging is a concept that provides for a single electronic mailbox for different types of messages. The mailbox can be on a user's host computer, PBX, PC, etc., and the user has consistent facilities available to originate, receive and manipulate messages. The 798 patent discloses that messages can be translated from one media to another for reception, and a single message may be composed of parts that use different native media. The 798 patent further describes that the message recipient has a single controllable point of contact where all messages can be scanned and/or viewed. The 798 patent teaches that, for example, if a user has a voice-mail service associated with a telephone station set and a data mail service available with a terminal (or PC), that user may specify either service as the recipient service. Thus, when the message arrives at either service, the notification of the arrival of the message is given only in the recipient service.

SUMMARY OF THE INVENTION

However, there are various problems associated with the known unified messaging systems. Illustratively, the known systems do not provide the capabilities necessary for today's mobile worker. For example, the known unified messaging systems do not provide message replication, i.e., message duplication, and message synchronization that is independent of the location of the in-basket such that the unified messaging system performs in an enhanced manner. Further, the known unified messaging systems do not provide replication and synchronization of messages using an incremental process to identify newly changed or added messages, as opposed to performing an operation that re-scans all messages. Accordingly, the present invention addresses these and other shortcomings of the conventional systems.

Accordingly, it is an object of the invention to provide a unified messaging system and method that provides an e-mail system and a voice-mail system without sacrifices to either of the systems.

It is another object of the invention to provide a unified messaging system that provides on-going synchronization while the e-mail system and a voice-mail system are in communication with each other and a post-login synchronization subsequent to the e-mail system and the voice-mail system re-gaining communication with each other.

It is another object of the invention to provide a unified messaging system and method that provides enhanced access of both e-mail messages and voice-mail messages by utilizing replication of the messages.

It is another object of the invention to provide a unified messaging system and method that provides enhanced synchronization between an e-mail message store and a voice-mail message store.

It is another object of the invention to provide a unified messaging system and method that attempts to provide a user with similar capabilities with respect to message manipulation regardless of whether the user is operating as a workstation client or a telephone client.

It is another object of the invention to provide a unified messaging system and method that provides a telephone client the ability to retrieve e-mail messages using text-to-speech technology.

In accordance with the system and method of the invention, a unified messaging system is provided that includes two-way synchronization and replication of messages. The unified messaging system includes a workstation, a voice-mail server, and an e-mail server. The workstation may be a personal computer, for example. The workstation includes an agent to monitor the operations of messaging activity in the workstation in accordance with the invention. Also, the voice-mail server includes a proxy e-mail client (PEC), i.e., a proxy e-mail receiver, to operate in the absence of the workstation.

More specifically, the agent monitors all status changes to messages stored in the workstation mailbox in the workstation. When a status change occurs in the workstation mailbox, such as a deleted or added message, the agent notifies the voice-mail server. Based on this notification, the voice-mail server synchronizes the messages stored in the voice-mail message store.

The voice-mail server monitors all status changes to messages stored in the voice-mail message store in the voice-mail server. When a status change occurs in the voice-mail message store, such as a deleted or added message, the voice-mail server notifies the agent. Based on this notification, the agent synchronizes the messages stored in the workstation mailbox. When the voice-mail server is not in communication with the agent, the voice-mail server may obtain e-mail messages using the proxy e-mail client (PEC). However, whenever the voice-mail server is in communication with the agent, the proxy e-mail client is inactive.

The unified messaging system in accordance with the invention performs "on-going synchronization" when the agent and the voice-mail server are in communication with each other. Specifically, in on-going synchronization, the agent informs the voice-mail server as soon as a status change occurs in the workstation mailbox. Further, in on-going synchronization, the voice-mail server informs the agent as soon as a status change occurs in the voice-mail message store.

Alternatively to "on-going synchronization," the unified messaging system in accordance with the invention performs "post-login synchronization" subsequent to the agent and the voice-mail server regaining communication with each other, subsequent to not being in communication. In post-login synchronization, each of the agent and the voice-mail server informs the other regarding message status changes during the period of non-communication.

As used herein, the term "workstation" is intended to encompass any of a wide variety of processing systems or personal computers including a personal computer (PC), a laptop computer, or any other type of desktop computer. Further, as used herein, a "workstation client" is defined as a user of a workstation who utilizes an e-mail application such as Microsoft OUTLOOK®. The workstation client may be located on a LAN, be a Remote Access Service (RAS) client, or be a wireless user, for example. Further, a "telephone client" is defined as a user of a telephone set. The telephone client may be located on a PSTN or located directly on a PBX. As described herein, the "unified messaging system is fully operating on the network" if each of the workstation including all of its messaging components, the voice-mail server, and the e-mail server are connected to each other and operating in communication with each other.

In accordance with the system and method of the invention, two-way synchronization Is and replication is provided. The two-way synchronization and replication operates between the workstation and the voice-mail server. Specifically, the replication operates between the e-mail store, e.g., the mailbox, of the workstation and the voice-mail store of the voice-mail server. The replication duplicates messages in each of the mailbox of the workstation and the voice-mail database of the voice-mail server. Thus, the voice-mail store contains both the voice-mail and the e-mail. Further, the e-mail store contains both the e-mail and the voice-mail.

Accordingly, the unified messaging system of the invention unifies two distinct systems, i.e., a voice-mail system and an e-mail system. Further, the unified messaging system of the invention unifies the respective stores of an e-mail system and a voice-mail system.

Accordingly, the system and method of the invention provides various advantages. For example, a computer laptop user may take the laptop on a trip. It is common for e-mail to be stored on the laptop once the laptop is disconnected from the network. However, in accordance with the system and method of the invention, the voice-mail may additionally be stored on the laptop. Accordingly, the voice-mail is also accessible to the user in a stand-alone mode. This is a further accessibility advantage.

The unified messaging in accordance with the invention provides various other advantages as a result of the replication of messages. The invention provides the ability to access voice-mail and e-mail from the telephone regardless of whether the workstation, i.e., the workstation client, or the e-mail server, is operating. The invention also provides the ability to access voice-mail and e-mail from the workstation regardless of whether the voice-mail system is operating. Thus, a user will have access to e-mail and voice-mail twenty-four hours a day, from either the workstation or the telephone, regardless of what is happening on the network.

Accordingly, replication is performed in accordance with the invention to provide enhanced accessibility. As a result of the replication performed, it is necessary to synchronize the duplicated messages. That is, whatever happens to a message on either the voice-mail end or the e-mail end has to be notified to the other end. For example, a user may delete a voice-mail while operating his laptop on a plane.

Once the user reconnects to the voice-mail system, the voice-mail system necessarily needs to know that the message was deleted. Otherwise, the voice-mail system may treat the message as a new message. This is merely one example of the synchronization operations performed by the system and method of the invention.

The synchronization perform by the unified messaging system of the invention may be characterized as "two-way synchronization" because it is really a bilateral process performed between the two respective data stores of the voice-mail system and the e-mail system. Either end has to tell the other end what the other has done, hence two way.

Another advantage provided by the system and method of the invention is the non-requirement of a message being in a certain location. Specifically, an e-mail user may use an arrangement in which the e-mail messages are maintained on a personal store in the user's workstation, for example. Alternatively, other users may store the e-mail on the server. The distinction between these two arrangements is whether the e-mail messages are on the hard drive of the workstation or not. However, the unified messaging system of the invention may operate regardless of whether the e-mail is in a personal store in a user's workstation or maintained on the server.

Further, the system and method of the invention provide unified messaging while preserving existing voice-mail architecture and existing e-mail architecture. Further, the system and method of the invention maintains how the conventional voice-mail is linked to and interacts with the different switches in the world including private branch exchange (PBX) switches.

It should be recognized that there are a wide variety of e-mail systems available on the market presently and more being developed for the future. A number of these competing e-mail systems are not compatible with each other. The system and method of the invention provide a unified messaging system which may work in conjunction with a wide variety of e-mail systems.

In accordance with an embodiment of the invention, a unified messaging system provides access to e-mail messages and voice-mail messages. The unified messaging system comprises a workstation that interfaces with a user. The workstation includes an agent responsible for e-mail message replication and synchronization of both e-mail and voice-mail messages; a voice-mail service provider responsible for voice-mail message replication and sending voice-mail messages; an e-mail service provider for retrieving and sending e-mail messages; a messaging sub-system for supporting the voice-mail service provider and the e-mail service provider, and a workstation mailbox for storing messages, said agent monitoring message activity in the workstation mailbox. The message system also includes a voice-mail server that sends and receives voice-mail messages, the voice-mail server comprising a voice-mail message store for storing messages, the voice-mail server responsible for voice-mail message and e-mail message replication and synchronization of both e-mail messages and voice-mail messages in concert with the agent. Further, the messaging system includes a communication system variably connecting each of the workstation, the voice-mail server, and the e-mail server with each other.

BRIEF DESCRIPTION OF THE DRAWINGS

These and other aspects of the invention will become apparent from the following descriptions which illustrate exemplary embodiments of the invention when read in conjunction with the accompanying drawings, in which.

DETAILED DESCRIPTION OF THE PREFERRED EMBODIMENTS

Figure 1:
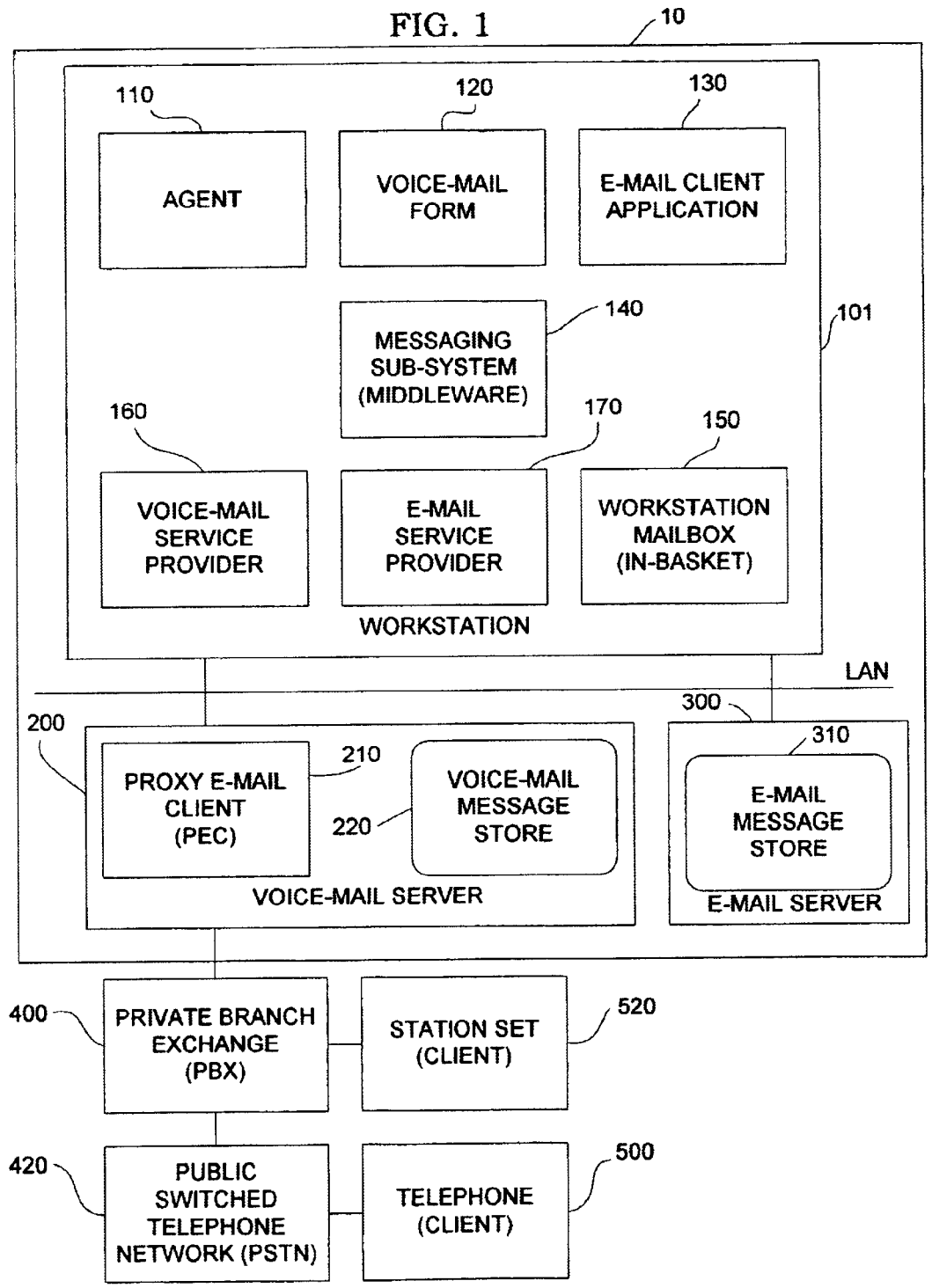
FIG. 1 is block diagram showing a unified messaging system in accordance with the system and method of the invention.

With reference to the accompanying drawings wherein like numbers have been used to represent like features, FIG. 1 is a block diagram showing the various components forming a unified messaging system 10 in accordance with the invention. As shown in FIG. 1, the unified messaging system 10 includes a workstation 101, a voice-mail server 200, and an e-mail server 300. The workstation 101 may be a personal computer that is used by a user, i.e., a "workstation client," for example. Each of the workstation 101, the voice-mail server 200 and the e-mail server 300 are connected by a local area network (LAN).

As shown in FIG. 1, the voice-mail server is connected to a PBX switching system 400. Further, the PBX switching system 400 is connected to the public switched telephone network (PSTN) 420. The PSTN 420 is in turn connected to a telephone set 500 operated by a user, i.e., a "telephone client," for example. As used herein, a "telephone client" is defined as a user of the telephone set 500. Alternatively, a station set (client) 520 may be connected to the PBX switching system 400 to provide telephone access.

The workstation 101 may be connected to voice-mail server 200 and the e-mail server 300 using a local area network (LAN). However, it should be recognized that connection via a LAN is merely illustrative. Alternatively, the workstation 101 may be connected to the voice-mail server 200 and the e-mail server 300 using a Remote Access Service (RAS) connection across the telephone line, for example. Using a RAS connection, a workstation client is effectively on a remote node of the LAN. Accordingly, any of the features of the system and method of the invention that would work directly on the LAN, can also work with the RAS workstation client. Accordingly, for all purposes as far as the workstation client is concerned, the workstation client is directly on the LAN.

As shown in FIG. 1, the workstation 101 includes an agent 110, a voice-mail form 120, an e-mail client application 130, a messaging sub-system 140, a voice-mail service provider 160, and an e-mail service provider 170. The workstation 101 also contains the workstation mailbox 150, which stores messages. The workstation mailbox 150 is used by the agent 110, the voice-mail form 120 and the e-mail client application 130. The agent 110 monitors the messaging activities in the workstation mailbox 150 of the workstation 101 in accordance with the system and method of the invention. The features and operation of the agent 110 are described below.

The voice-mail form 120 is an application that is implemented on the workstation 101. The voice-mail form 120 is an interface window to allow workstation client input. The voice-mail form 120 displays both voice-mail and fax messages. The voice-mail form 120 is used by the workstation 101 to render, compose and send voice-mail and facsimile mail messages, as is known in conventional systems.

The e-mail client application 130 in the workstation 101 may be any suitable e-mail client application such as Microsoft OUTLOOK®. The e-mail client application 130 is enabled on top of the messaging sub-system 140 and relies upon the services of the messaging sub-system 140. The messaging sub-system 140 in the workstation 101 essentially acts as the interface or middleware between each of the voice-mail service provider 160 and e-mail service provider 170 and the e-mail client application 130 and the workstation mailbox 150. Specifically, the messaging sub-system 140 creates messages from the information sent to the voice-mail service provider 160 and the e-mail service provider 170 and deposits those messages in the workstation mailbox 150. Illustratively, the messaging sub-system 140 may utilize a messaging application program interface (MAPI), a Microsoft interface. MAPI might be characterized as an exemplary e-mail architecture or infrastructure that implements communications between components. MAPI is commonly used to dictate how a workstation talks to a server to send and receive messages. However, the messaging sub-system 140 may utilize any of a wide variety of interface architectures including Lotus NOTES®, Novell GROUPWARE® or any other suitable middleware.

The workstation 101 contains the workstation mailbox 150 that is used by the agent 110, the voice-mail form 120 and the e-mail client application 130. Further, it should be recognized that each of the agent 110, the voice-mail form 120 and the e-mail client application 130 have the same access to the workstation mailbox 150. The workstation mailbox 150 contains both voice-mail and e-mail messages that are obtained from the e-mail server 300 and the voice-mail server 200. In accordance with one embodiment of the system and method of the invention, the workstation mailbox 150 may be the in-basket, i.e., where incoming e-mail messages are provided.

Specifically, the e-mail service provider 170 may retrieve e-mail messages. The e-mail service provider 170 will either retrieve an e-mail message "100" from the e-mail server 300 or simply view the e-mail message 100, depending on the location of the in-basket. When retrieving the e-mail message 100, the e-mail will be removed from the e-mail server 300 and placed in the workstation mailbox 150. In contrast, if the e-mail service provider 170 simply views the e-mail, the e-mail is left on the e-mail server 300.

The voice-mail service provider 160 in the workstation 101 communicates with the voice-mail server 200 to send and receive voice-mail messages. The voice-mail service provider 160 may be any suitable conventional voice-mail service provider. As used herein, it should be recognized that "voice-mail" is a traditional voice-mail message, facsimile message, or any other type of message that originates from a telephone. Further, as used herein, an "e-mail message" may be any message that contains text information, audio information, video information, and/or facsimile information, for example, i.e., a multi-media e-mail.

The e-mail service provider 170 in the workstation 101 may be any suitable service provider. In operation, the e-mail service provider 170 receives e-mail messages from the e-mail server, if the workstation mailbox 150 is actually in the workstation, as well as sends e-mail messages to the e-mail server. The e-mail service provider 170 effectively acts as the interface between the messaging sub-system 140, which may use MAPI, for example, and the e-mail server. Thus, the e-mail server 300 must be compatible with the messaging subsystem 140. Accordingly, if the messaging sub-system 140 uses MAPI, for example, then the e-mail service vendor must provide a MAPI service provider.

As shown in FIG. 1, the voice-mail server 200 includes a proxy e-mail client (PEC) 210. The voice-mail server 200 includes the voice-mail message store 220. For example, the voice-mail message store 220 may be on the local hard drive of the voice-mail server 200. This arrangement of the voice-mail server 200 and the voice-mail message store 220 is consistent with traditional voice-mail systems which have their own database. However, it should be recognized that the voice-mail message store 220 could be connected to the voice-mail server 200, such as from a separate computer, as opposed to being a part of the voice-mail server 200.

In accordance with the system and method of the invention, the proxy e-mail client (PEC) 210 in the voice-mail server 200 operates to receive and send e-mails when the workstation 101 is not operative. Further, the proxy e-mail client 210 communicates with the voice-mail server 200 to determine which e-mails the voice-mail server 200 has previously retrieved. Further, it should be recognized that the proxy e-mail client 130 may run on a computer completely separate from the voice-mail server computer.

As described in detail below, well known Internet messaging protocols, such as POP3, are used by the PEC to retrieve e-mail messages from the e-mail server 300 when the workstation 101 is inoperative. The operation between the voice-mail server 200 and the e-mail server 300 allows a telephone client to continue to get e-mail messages when the agent is inoperative. As may be recognized, this feature is especially useful for mobile users who heavily or exclusively rely on use of the telephone.

In operation, when the workstation 101 is down, the proxy e-mail client (PEC) 210 sends a request for any e-mails to the e-mail server 300. The e-mail server 300 receives this request in accordance with standard protocol. The protocol may be POP3 or IMAP4, for example, or any other suitable protocol. It should be recognized that if the proxy e-mail client 210 uses a POP3 protocol, then the e-mail server must support the POP3 protocol. Also, the proxy e-mail client maintains a history of e-mail messages processed in order to only process new messages at each pull.

As shown in FIG. 1, the e-mail server 300 includes an e-mail message store 310. However, it should be recognized that the e-mail message store 310 could instead be on a separate computer, as opposed to being a part of the e-mail server 300.

As described above, in accordance with the system and method of the invention, the workstation 101 includes the agent 110. The agent 110 monitors the in-basket, i.e., workstation mailbox, activities of the workstation 101 in accordance with the system and method of the invention. Thus, if the workstation 101 is up and running the agent 110 will take care of accepting e-mail messages.

In particular, the agent 110 monitors operations including reading an e-mail, sending an e-mail, deletions, movement of the message between folders in the workstation mailbox 150, or any other operation that results in a change in status of either an e-mail or a voice-mail present in the workstation mailbox 150. The occurrence of these events will be processed by the agent 110. As a result, the agent 110 will notify the voice-mail server 200 regarding the change in status.

FIG. 1 shows both a voice-mail server 200 and an e-mail server 300. Traditionally, the voice-mail server 200 and the e-mail server 300 have existed as distinct and separate entities. However, in accordance with the system and method of the invention, these distinct entities are unified using the workstation mailbox 150 with the agent 110, in conjunction with other aspects of the invention. The workstation mailbox 150 provides the integration between the voice-mail world and the e-mail world. The workstation mailbox 150 contains both the voice-mail and e-mail messages.

As shown in FIG. 1, the voice-mail server 200 and the e-mail server 300 are not run on the same processing system, e.g., on the same computer. However, it should be recognized that both the voice-mail server 200 and the e-mail server 300 could be run on the same computer.

Thus, as described above, the unified messaging system 10 of the invention includes the workstation 101, the voice-mail server 200, and the e-mail server 300. In accordance with further aspects of the system and method of the invention, messages are replicated in the workstation 101 and the voice-mail server 200. Illustratively, a voice-mail message 100 is stored in both the workstation mailbox 150, as well as the voice-mail message store 220. More specifically, appropriate attributes of each message are stored in each of the workstation mailbox 150 and the voice-mail message store 220. What are appropriate attributes may vary depending on the particular operating requirements of the user. Thus, if there is a disconnection between the voice-mail server 200 and the workstation 101, the workstation client can still access a message in the workstation mailbox 150, even if the message was obtained from the voice-mail server 200. Thus, it should be appreciated that the replication in accordance with the invention is distinct from conventional techniques that use a pointer in an inbox pointing to the message in the voice-mail database.

As used herein, the notations "e-mail message 100" and "voice-mail message 100" are used for purposes of explanation. Illustratively, the notation regarding "e-mail message 100" is used in conjunction with explaining a certain synchronization process with reference to a single e-mail message, i.e., the e-mail message 100. Further, it should be recognized that as used herein, the terms "e-mail" and "e-mail message" have been used interchangeably.

As a result of the replication of the invention, duplicate messages are stored in each of the workstation mailbox 150 and the voice-mail message store 220. Thus, it should be recognized that the unified messaging system 10 of the invention does require additional electronic storage facilities to retain the duplicate messages. However, the replication of the invention allows access to both voice-mail and e-mail from either the workstation 101 or the voice-mail server 200, even if the workstation 101 and the voice-mail server 200 are no longer connected due to the network being down, for example. This is in contrast to the techniques using a pointer, as described above. That is, the conventional pointer techniques rely on a connection to the message store, which is designated by the pointer. Further, the duplicate storage of the messages may enhance the speed of accessibility in certain operating environments.

Accordingly, the system and method of the invention provides various other advantages. A telephone client may have access to an e-mail system 24 hours a day without use of the workstation 101. Further, an e-mail is brought to the voice-mail message store 220 irrespective of the status of the workstation 101, by utilization of the PEC, during downtime of the workstation.

Accordingly, FIG. 1 shows the arrangement of a unified messaging system 10 in accordance with the system and method of the invention. The unified messaging system 10 provides enhanced operation between the workstation 101, the voice-mail server 200, and the e-mail server 300. There are a wide variety of synchronization scenarios that may take place in the 10. Illustrative scenarios are described below with reference to FIGS. 2–10, as well as FIGS. 11–24.

In accordance with one illustrative scenario, an outside caller places a call to the unified messaging system 10 of the invention. The phone call may have passed through a number of PBX switches to ultimately reach the voice-mail server 200. As a result, a voice-mail message 100 is created in the voice-mail message store 220. In the next step, the voice-mail server 200 notifies the voice-mail service provider 160 in the workstation 101 about the voice-mail message 100. Next, in accordance with the system and method of the invention, the voice-mail service provider 160 delivers the voice-mail message 100 to the messaging sub-system 140. The messaging sub-system 140 then deposits the voice-mail message 100 into the workstation mailbox 150 such that the voice-mail message 100 may be viewed and manipulated, for example.

In accordance with the system and method of the invention, "flags" or "message flags" may be associated with every message to designate the status of that message. The flags may be stored alongside the other attributes of the message. That is, the flags may be stored in the message and no other database is needed to maintain the flags. The utilization of the flags in the system and method of the invention provides for incremental synchronization of the status of messages between the workstation and the voice-mail server. Two message flags that may be used is the "duplicated flag" and the "synchronized flag." The duplicated flag may utilize the convention:

True=the message was duplicated; and
False=the message was not yet duplicated.

Additionally, the synchronized message flag may utilize the convention:

True=the message is synchronized in status; and
False=the message was not synchronized in status.

The "duplicated flag" and the "synchronized flag," and the use thereof, are described below. Further, it should be recognized that a third message flag is generated when a message is deleted. Specifically, this message flag may be characterized as a "deletion record." The flags allow incremental synchronization in accordance with the system and method of the invention. The deletion record may stored in the workstation mailbox 150, for example, and no separate data base is needed. That is, the deletion record is stored as an invisible item in the workstation mailbox 150.

Further, it should be recognized that if a message is not duplicated, then necessarily, the message cannot be synchronized. Accordingly, the synchronized flag may be ignored if the duplication flag is false (Dup=False).

Figure 2:
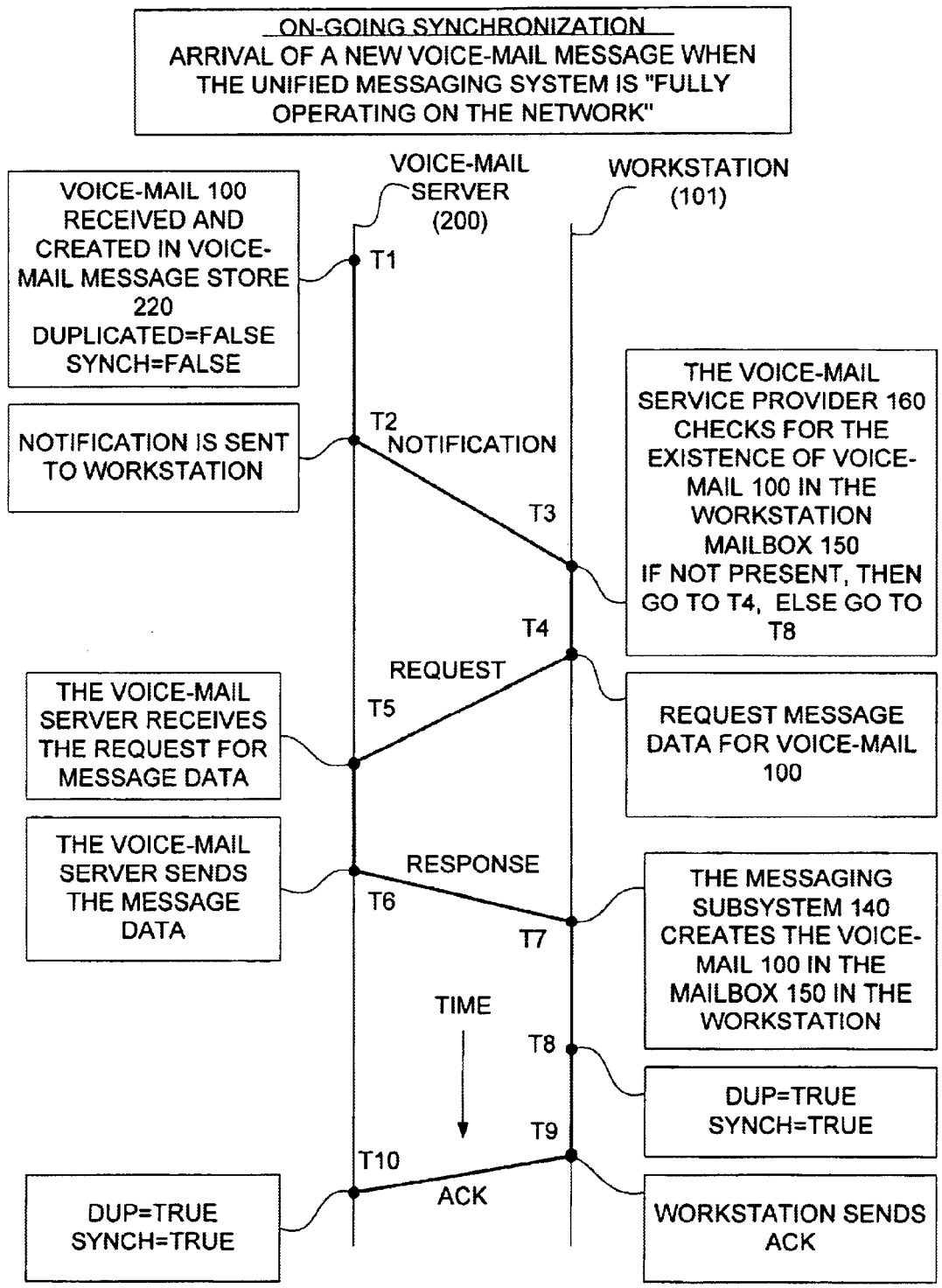
FIG. 2 is a diagram showing the arrival of a new voice-mail message when the unified messaging system is fully operating on the network during on-going synchronization in accordance with the system and method of the invention.

In further explanation of this illustrative scenario, FIG. 2 is a diagram showing the arrival of a new voice-mail message when the unified messaging system is "fully operating on the network." The term "new" message as used herein, whether a voice-mail message or an e-mail message, means that the message is new to the entire unified messaging system, i.e., and has not previously been created anywhere on the unified messaging system. Further, as shown in FIG. 2, the voice-mail server 200 and the workstation 101 are represented by left and right lines, respectively.

As shown in each of FIGS. 2–15, the vertical axis represents time, increasing downwards. Further, each line extending between the vertical lines, i.e., between the various times, represent a network message sent using a reliable transport mechanism, such as TCP/IP, for example.

As shown in FIG. 2, at $T_1$ the voice-mail message 100 is received by the voice-mail server and created in the voice-mail message store 220 of the voice-mail server 200. Message flags are associated with the message 100. Specifically, the message flags "duplicated=false" and "sync=false" are associated with the message 100 stored in the voice-mail message store 220. Then, at time $T_2$, the voice-mail server 200 notifies the voice-mail service provider in the workstation 101 about the voice-mail message 100. At time $T_3$, the voice-mail service provider checks for the existence of voice-mail 100 in the workstation mailbox 150. If at time $T_3$ the voice-mail is not in the workstation mailbox 150, then the process moves to time $T_4$. Otherwise, the process moves to time $T_8$.

At time $T_4$, a request for the message data for the voice-mail 100 is sent from the workstation 101 to the voice-mail server 200. At time $T_5$, the voice-mail server 200 receives the request for message data for the voice-mail message 100. Then, at time $T_6$, the voice-mail server sends the message data as a response to the workstation 101. At time $T_7$, the messaging sub-system 140 creates the voice-mail 100 in the mailbox 150 in the workstation 101. Then at time $T_8$, message flags are set for the voice-mail 100 in the mailbox 150 in the workstation 101. Specifically, the message flags are set "duplicated=true" and "sync=true." Then, at time $T_9$, the workstation 101 sends an ACK to the voice-mail server 200. At time $T_{10}$, the voice-mail server 200 receives the ACK and sets the message flags for the voice-mail message in the voice-mail message store 220 as "duplicated true" and "sync=true."

With regard to the e-mail server 300 shown in FIG. 1, it should be recognized that the e-mail server could be either an application running on a LAN or outside the LAN and hosted by an Internet service provider. This versatility is enabled by the messaging sub-system 140. Alternatively, another e-mail service provider, which may be used in conjunction with the unified messaging system of the invention, is an outside service provider that provides Internet access. In this manner, a small business, for example, does not have to deal with trouble shooting and other maintenance concerns associated with maintaining an independent e-mail server.

In accordance with a further illustrative scenario, and assuming that the voice-mail client is running, an e-mail message 100 is sent to the e-mail server 300. As a result, the e-mail server 300 delivers the e-mail message 100 to the e-mail service provider 170. In turn, the e-mail service provider 170 delivers the e-mail message 100 to the messaging sub-system 140. The messaging sub-system 140 then creates the e-mail message 100 in the workstation mailbox 150. Then, provided that the agent 110 is running, the agent 110 delivers the e-mail message 100 to the voice-mail server. The agent 110 thus replicates the message in the voice-mail server 200, i.e., in the voice-mail message store 220.

As described above, provided that the agent 110 is running, the agent 110 delivers the e-mail message 100 to the voice-mail server. It should be recognized that this is one example of the manner in which the agent 110 monitors the activities in the workstation mailbox 150. There are various other manners in which the agent 110 monitors the workstation mailbox 150, as described herein.

However, for the agent 110 to perform this monitoring, the agent 110 must be running while the messaging sub-system 140 is running, i.e., because message manipulation occurs while the messaging sub-system 140 is running. As a result, in accordance with this embodiment, the agent 110 is started whenever the messaging sub-system 140 is started.

Figure 3:
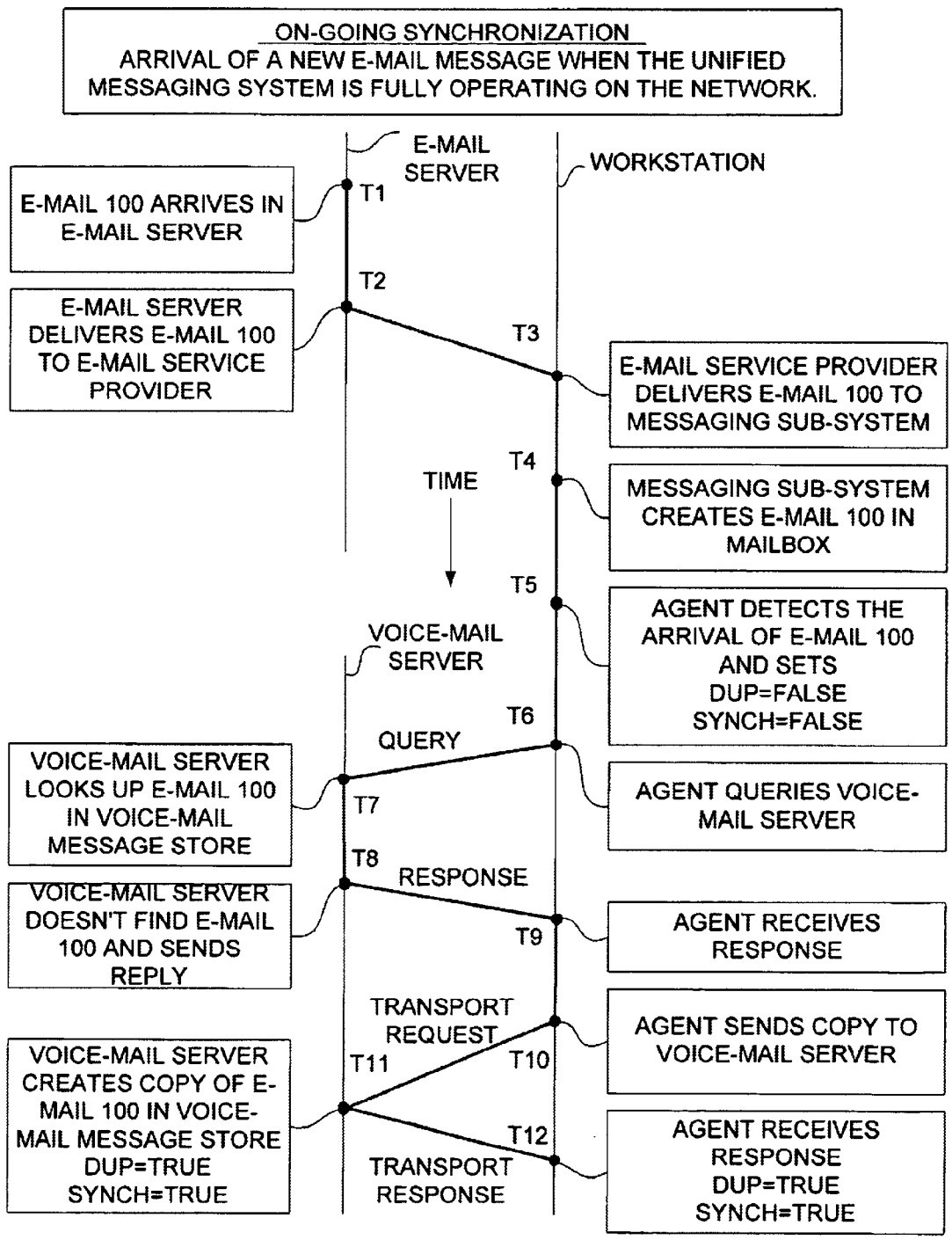
FIG. 3 is a diagram showing the arrival of a new e-mail message when the unified messaging system is fully operating on the network during on-going synchronization in accordance with the system and method of the invention.

In further explanation, FIG. 3 is a diagram showing the arrival of a new e-mail message when the unified messaging system is fully operating on the network. As shown in FIG. 3 at time $T_1$, an e-mail message 100 arrives at the e-mail server. Then, at time $T_2$, the e-mail server delivers the e-mail message 100 to the e-mail service provider in the workstation. At time $T_3$, the e-mail service provider delivers the e-mail message 100 to the messaging sub-system in the workstation. Then, at time $T_4$, the messaging system creates the e-mail message 100 in the workstation mailbox.

Then at time $T_5$, the agent detects the arrival of e-mail 100 and sets the message flags as (Dup=False) and (Synch=False). In accordance with the system and method of the invention, the detection is not performed using a scanning process to determine the arrival of new e-mail messages, but by a real time notification mechanism provided by the messaging sub-system. Then, at time $T_6$, the agent queries the voice-mail server. At time $T_7$, the voice-mail server looks up e-mail 100 in the voice-mail server message store. Then, at time $T_9$, the voice-mail server does not find e-mail 100 and sends a reply to the agent. At time $T_9$, the agent receives a response from the voice-mail server. Then, at time $T_{10}$, the agent sends a copy of the e-mail 100 to the voice-mail server. Then, at time $T_{11}$, the voice-mail server creates a copy of the e-mail 100 in the voice-mail message store and sets the message flags as (Dup=True) and (Synch=True). Then, at time $T_{12}$, the agent receives the response from the voice-mail server and sets the message flags as (Dup=True) and (Synch=True).

In accordance with a further illustrative example, the workstation 101 is not running, i.e., is down or disconnected from both the voice-mail server 200 and the e-mail server 300. However, the voice-mail server 200 is in connection with the e-mail server 300. Additionally, the user is a telephone client, i.e., desires to obtain messages using the telephone. In response to the down status of the workstation 101, the voice-mail server 200 activates the proxy e-mail client 210. The voice-mail server 200 may be informed of the status of the workstation 101 in any suitable manner. For example, the voice-mail server 200 could periodically poll the workstation 101 to determine if the workstation 101 is on-line. If the voice-mail server 200 does not receive a response from the workstation 101, then the voice-mail server 200 activates the proxy e-mail client 210. The proxy e-mail client 210 effectively proxies for the workstation 101 in order to provide the voice-mail server 200 with accessibility to incoming e-mail messages.

It should be recognized that in accordance with the preferred embodiment of the invention, the workstation 101 and the proxy e-mail client 210 do not operate simultaneously to the same mailbox. That is, when the workstation 101 is on-line and operating, the proxy e-mail client 210 is not active. Further, once the voice-mail server 200 detects that the workstation 101 is up, the voice-mail server 200 and/or the proxy e-mail client 210 is notified that that particular user no longer needs the services of the proxy e-mail client 210. Accordingly, the proxy e-mail client 210 will be deactivated for that particular user. Accordingly, the proxy e-mail client 210 and workstation do not both receive messages. Additionally, it should be recognized that the proxy e-mail client 210 may support more than one telephone client. That is, the PEC is capable of retrieving e-mail messages for multiple mailboxes. Specifically, the PEC 210 polls e-mail mailboxes for any voice-mail mailbox with an inactive workstation agent.

In accordance with the system and method of the invention, there are two manners in which the proxy e-mail client 210 can retrieve e-mail messages from the e-mail server 300. The first method is a POP3 pull in which the proxy e-mail client 210 proactively requests the e-mail server 300 to provide any additional messages it has received. The proxy e-mail client 210 asks "Do you have any e-mail messages?" Further, the proxy e-mail client 210 will remember the e-mails it retrieves. Alternatively, the proxy e-mail client 210 can receive the e-mail messages, if it is a simple message transport protocol (SMTP) server, i.e., the e-mails are pushed to the proxy e-mail client 210.

In accordance with one illustrative embodiment, the proxy e-mail client 210 is not all the time talking to the e-mail server 300, but only periodically. This aspect is important because between one pull of e-mails to another, there may be the same messages present on the e-mail server 300. Also, it should be to recognized that the proxy e-mail client 210 does not take the e-mail message off the e-mail server 300. If the proxy e-mail client 210 did take the e-mail message off the e-mail server 300, the next time the workstation 101 logged on, that e-mail message could not be obtained by the workstation 101 for transfer into the workstation mailbox 150. Thus, the proxy e-mail client 210 would have to provide the e-mail message to the workstation mailbox 150.

However, in accordance with the system and method of the invention the proxy e-mail client 210 never removes an e-mail message from the e-mail server. It only retrieves the e-mail message for use in the absence of the workstation 101. Thus, the proxy e-mail client 210 gets a copy of the e-mail message, but never removes the e-mail message. In this manner, the operation of the proxy e-mail client 210 does not interfere with the ability that the workstation client later has to retrieve the e-mails using the workstation 101. Subsequent to the proxy e-mail client 210 retrieving an e-mail message, the e-mail message is stored in the voice-mail message store 220.

Accordingly, it should be recognized that the workstation 101 does not get any information from the proxy e-mail client 210. Rather, the workstation 101 synchronizes with the voice-mail server 200 and the voice-mail message store 220 associated with the voice-mail server 200. Thus, the workstation 101 does not interact with the proxy e-mail client 210. In particular, the proxy e-mail client 210 does not act as an e-mail server to the workstation 101.

As described above, POP3 is one method that the proxy e-mail client 210 uses to retrieve messages from the e-mail server 300. The POP3 pull allows the proxy e-mail client 210 to determine if a new e-mail has arrived in the e-mail server 300. Using the POP3 pull, the proxy e-mail client 210 may see the same contents as in previous pulls, plus new messages that have arrived in the e-mail server 300. The proxy e-mail client 210 will only retrieve the new messages.

As an alternative mode to a POP3 pull, the proxy e-mail client 210 may use a SMTP protocol, as noted above. The specific mode used depends on the capabilities of the e-mail server 300. The SMTP protocol allows a server to actually proactively forward e-mails on its own. Thus, the e-mail server 300 forwards the e-mail messages to the proxy e-mail client 210 in accordance with SMTP protocol.

The SMTP protocol may be desirable in certain circumstances. Specifically, the SMTP protocol avoids certain attributes associated with POP3. Illustratively, when the POP3 protocol is used to pull the messages, the e-mail server requires a user identification (ID) and a password. The user ID and the password are sent over the LAN. This raises security concerns in and of itself.

However, an additional problem with the POP3 protocol in use with the system and method of the invention is that the password needs to be communicated to the proxy e-mail client 210. Accordingly, there may be certain security concerns with conveying the password to the voice-mail server facility. In particular, this is true since the password for a user's e-mail server often corresponds to the password for the user's computer. Thus, a situation is created in which the user has to give the user's password over to the user's voice-mail administrator.

Accordingly, it should be recognized that each of the SMTP protocol or the POP3 protocol may be used in accordance with the system and method of the invention and that lo either has certain advantages and disadvantages. Thus, the POP3 may be used where the e-mail server does not have the SMTP capability. Further, it should be recognized that the proxy e-mail client 210 is configurable on a mailbox basis to use POP3 or SMTP depending on the need.

Accordingly, in summary of the operation of the proxy e-mail client 210, it should be recognized that the proxy e-mail client 210 does not remove e-mail from the e-mail server 300; the proxy e-mail client 210 keeps track of e-mails already retrieved; and the proxy e-mail client 210 never acts as an e-mail server to the workstation. Rather, the proxy e-mail client 210 takes the place of the agent when the workstation is unavailable. It should also be recognized that when the workstation 101 becomes in communication with the voice-mail server, the workstation 101 does not rely on the proxy e-mail client 210 for anything. Thus, the proxy e-mail client 210 has fulfilled its job when the workstation 101 was unavailable.

It should be recognized that a long period of time can occur with the workstation 101 never being on. Thus, as a result, the proxy e-mail client 210 necessarily needs to effectively proxy for the workstation 101 for long periods of time. Relatedly, the invention addresses a concern that a telephone client may get e-mail over the phone, turn on the workstation at some later time acting as a workstation client, and then get the e-mail again. That is, a user comes back to the office, accesses the e-mail account, and gets all the e-mails that the user has previously reviewed via the telephone. However, in accordance with the system and method of the invention the messages are synchronized to eliminate this concern. That is, in accordance with the invention, a post-login synchronization process is performed, as described below.

In summary, in the post-login synchronization process, the voice-mail server 200, not the proxy e-mail client 210, tells the agent 110 in the workstation 101 that an e-mail message 100 was deleted or an e-mail 200 was read, for example. The voice-mail server 200 informs the agent 110 of everything that has happened to the e-mails and voice-mails in the voice-mail message store since the workstation 101 has been unavailable. Reciprocally, the agent 110 tells the voice-mail server 200 everything that has happened to the e-mails and voice-mails in the workstation mailbox since the voice-mail server 200 has been disconnected with the agent 110. Accordingly, the voice-mail server 200 and the agent 110 are updating each other. In accordance with one embodiment, the voice-mail server 200 and the agent 110 may take turns updating the other.

Figure 4:
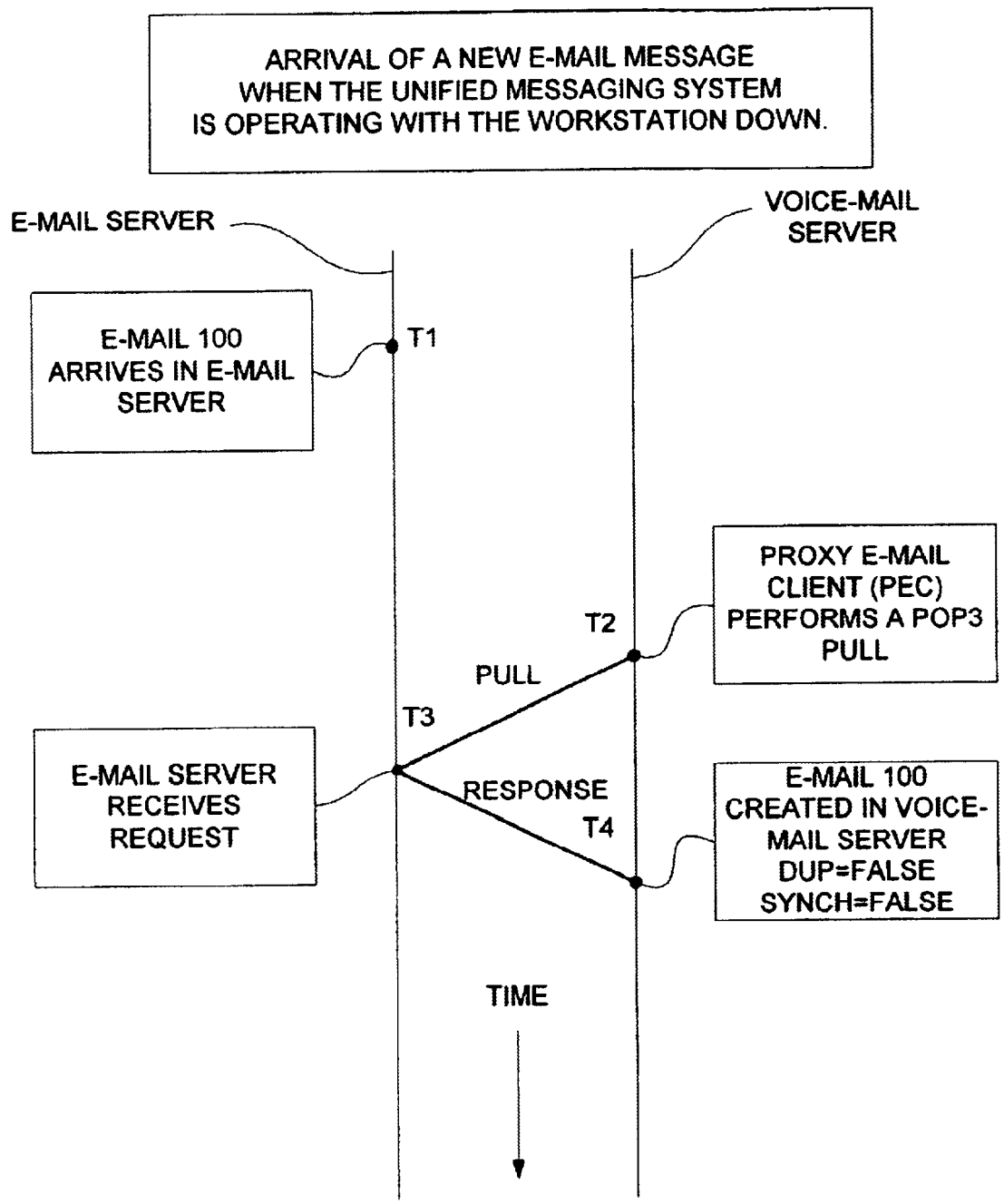
FIG. 4 is a diagram showing the arrival of a new e-mail message when the unified messaging system is operating, with the workstation down, in accordance with the system and method of the invention.

In further explanation, FIG. 4 is a diagram showing the arrival of a new e-mail message when the unified messaging system is operating with the workstation down. At time $T_1$, the e-mail message 100 arrives in the e-mail server. As illustrated in FIG. 4, the workstation is down. Accordingly, as described above, when the workstation is down, the proxy e-mail client (PEC) will be active. Accordingly, at time $T_2$, PEC performs a POP3 pull to retrieve the e-mail message 100 from the e-mail server. Thereafter, at time $T_3$, the e-mail server receives the request from the voice-mail server. Then, the e-mail server responds. Then, at time $T_4$, the e-mail 100 is created in the voice-mail message store. The voice-mail server sets the message flags (Dup=False) and (Synch=False).

In accordance with one embodiment of the system and method of the invention, the e-mail client application 130, upon start-up, launches the messaging sub-system which launches the agent 110, as well as the voice-mail service provider 160 and the e-mail service provider 170. Accordingly, if the e-mail application client 130 is not launched, then the workstation 101 is not in operation, even though the workstation may be running, i.e., the personal computer may be running. Thus, if the workstation client is not running Microsoft OUTLOOK® or another messaging client application, the workstation client is effectively off-line. At this time, the proxy e-mail client 210 would be retrieving e-mails, as described above.

Accordingly, as described above, a post-login synchronization process is performed after an e-mail message 100 is retrieved by the proxy e-mail client 210 and the workstation 101 subsequently comes in communication with the voice-mail server. As a result of the proxy e-mail client 210 retrieving the e-mail message 100, the e-mail message 100 is created in the voice-mail message store by the proxy e-mail client 210. In the post-login synchronization process, the e-mail client application 130, i.e., the client messaging application, is first started. The e-mail client application 130 then retrieves any e-mails on the e-mail server 300, i.e., the e-mail message 100. Specifically, the e-mail service provider 170 queries the e-mail server 300 to receive the new e-mail message 100. Note that, as described above, an e-mail message 100, for example, has been retrieved by the proxy e-mail client 210. However the e-mail message 100 has not been retrieved by the e-mail service provider 170.

The e-mail service provider 170 may use a POP3 protocol or any other suitable protocol. The e-mail service provider 170 will either retrieve the e-mail message 100 from the e-mail server 300 or simply view the e-mail message 100, depending on the location of the in-basket. When retrieving the e-mail message 100, the e-mail will be removed from the e-mail server 300 and placed in the workstation mailbox 150.

The agent 110 in the workstation 101 monitors the contents of the workstation mailbox 150. Thus, in response to the creation of the e-mail message 100 in the mailbox, the agent recognizes the new e-mail message and queries the voice-mail server 200 about the e-mail message 100. Specifically, the agent asks the voice-mail server whether it has the e-mail message 100 as a result of operations of the proxy e-mail client 210. The agent 110 does not know whether the e-mail message 100 was retrieved by the proxy e-mail client 210. Accordingly, it must query the voice-mail server to determine if the e-mail message 100 was retrieved. Thus, if the e-mail 200 has not been retrieved by the proxy e-mail client 210, then the agent will deliver it, i.e., deliver the e-mail message 100 to the voice-mail server. Further, it should be appreciated that the query and response are short messages so as to not greatly effect the bandwidth of the LAN, i.e., so as to not cause degradation to the LAN. Then, for example, the agent 110 determines that yes, the e-mail message 100 was already retrieved. Further, the agent 110 obtains the current status, including deleted, read, new, from the voice-mail server 200. Alternatively, if the e-mail message 100 had not already been retrieved, then the process illustrated in FIG. 3 would be performed.

If an e-mail obtained by the proxy e-mail client 210 is deleted, a record is kept of the e-mail, i.e., a "deletion record." Thus, the voice-mail server 200 doesn't keep an entire e-mail message, but rather a record of the e-mail message. Thus, the agent 110 applies the status of e-mail message 100, which has been retrieved by the proxy e-mail client 210.

In accordance with a further aspect of the system and method of the invention, a user may select a "confirm deletion" feature in either the workstation 101, the voice-mail server 200, or both. That is, a situation may be present in which a workstation client deleted a voice-mail message 100 while operating the workstation. Using the confirm deletion feature, the next time the user is a telephone client, that user will be requested to confirm deletion of the voice-mail message 100. Alternatively, a situation may be present in which a telephone client deleted an e-mail message 200 while calling in to get her messages using the telephone and while the agent was inoperative. Using the confirm deletion feature, the next time the user is a workstation client, that user will be requested to confirm deletion of the e-mail message 200. In accordance with this embodiment, the default is not to activate the confirm deletion feature. That is, if the workstation client deletes a voice-mail message, the unified messaging system of the invention will not request any further confirmation prior to deleting that voice-mail from the voice-mail server.

In accordance with yet a further aspect of the system and method of the invention, a user may be provided with the ability to alter the preferences executed when performing post-login synchronization. For example, one user may want the situation of a read, i.e., old, message in the workstation 101 and a new, i.e., unread, message in the voice-mail server 200 to synchronize to a read message. Alternatively, another user may want the situation of a read message in the workstation 101 and a new message in the voice-mail server 200 to synchronize to a new message.

Figure 5:
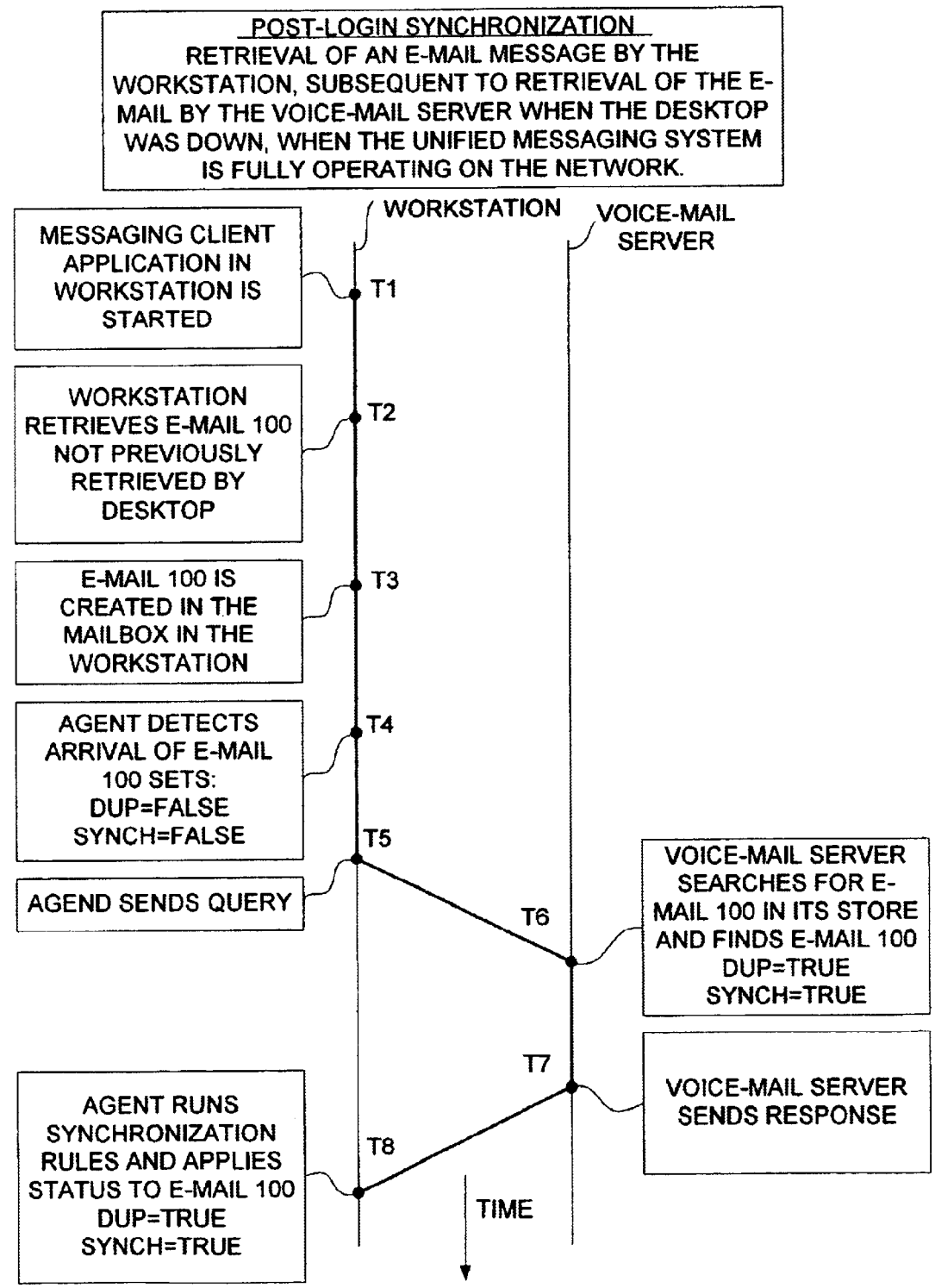
FIG. 5 is a diagram showing a post-login synchronization process including the retrieval of an e-mail message by the workstation, subsequent to retrieval of the e-mail by the voice-mail server when the workstation was down, when the unified messaging system is fully operating on the network in accordance with the system and method of the invention.

FIG. 5 is a diagram showing the retrieval of an e-mail message by the workstation, subsequent to the e-mail by the voice-mail server when the workstation was down, when the unified messaging system is fully operating on the network. Accordingly, FIG. 5 illustrates a situation subsequent to the process illustrated at FIG. 4. At time $T_1$, the messaging client application in the workstation is started. Then, at time $T_2$, the workstation retrieves an e-mail message 100 not previously retrieved by the workstation. However, the e-mail message 100 has been previously retrieved by the PEC, which is located in the voice-mail message store. Then, at time $T_3$, the e-mail message 100 is created in the mailbox in the workstation.

As shown in FIG. 5, at time $T_4$, the agent detects the arrival of e-mail 100 and sets the message flags as (Dup=False) and (Synch=False). Then, at $T_5$, the agent sends the query to the voice-mail server. Then, at time $T_6$, the voice-mail searches for e-mail 100 in its message store and finds its e-mail 100. The voice-mail server sets the message flags as (Dup=True) and (Synch=True). Then, at time $T_7$, the voice-mail server sends a response. Then, at $T_8$, the agent runs the synchronization rules and applies the status to the e-mail 100. The agent sets the message flags as (Dup=True) and (Synch=True).

Accordingly, FIG. 5 shows how the post-login synchronization is performed after the proxy e-mail client 210 is operated and then the workstation 101 is turned on. After the workstation 101 is turned on and the e-mail messages are retrieved from the e-mail server 300, the agent 110 sees the e-mails in the mailbox 150, as described above. With respect to e-mail, in order to compare what the agent 110 observes as an e-mail and what the voice-mail server 200 observes as an e-mail, an attribute of the e-mail is used. In accordance with one embodiment of the system and method of the invention the attribute used is the Internet Message-ID."

The Internet Message-ID has been established as a standard for e-mail messages on the Internet. In accordance with the protocol, a sender generates the Message-ID and tags the Message-ID onto the e-mail. The Internet Message-ID possesses a guaranteed uniqueness across time and space. Thus, the Internet Message-ID is a legitimate ID to utilize in the system and method of the invention. Accordingly, in accordance with one embodiment of the invention, the workstation 101 asks the voice-mail server 200 whether the voice-mail server 200 has an e-mail with a particular Internet Message-ID?

Potentially, the proxy e-mail client 210 may have to maintain a large amount of Internet Message-IDs over a period of time. With reference to deleted messages, illustratively, when a user returns from a long trip, the operation of the proxy e-mail client 210 may result in thousands of records of deleted messages. These records may be stored in the voice-mail message store 220. All the records regarding deleted messages are deleted after the workstation 101 comes on-line with the voice-mail server.

However, there may be a situation where the user never logs on from the workstation. In this situation, these records may be effectively purged after a predetermined period of time. The records may be purged after thirty-one days, for example. An adverse side effect of purging after a predetermined period of time is that, upon turning on the workstation, there will be no record that the user has read and deleted the message. Thus, the e-mail will be downloaded again from the e-mail server. However, this adverse side effect may not outweigh the concerns of exhausting available memory as a result of not purging for an extended period of time.

In accordance with a further illustrative example, the status of messages is changed in the workstation 101 when the unified messaging system is fully operating on the network. That is, each of the workstation 101, the voice-mail server 200 and the e-mail server 300 are connected an operating on the network. In this situation, an ongoing synchronization of messages occurs. In this situation, the agent 110 in the workstation 101 is logged on to the voice-mail server 200.

Illustratively, the status of a message is changed in the workstation. As a result, the agent 110 marks the changed message as not synchronized. Then, the agent 110 notifies the voice-mail server 200 of the new status. This is not a new message, but rather a new status of an existing message that was stored in both the voice-mail message store 220 and the workstation mailbox 150. Then, the voice-mail server 200 applies the new status to the corresponding message stored in the voice-mail message store 220.

As described above, the agent 10 notifies the voice-mail server 200 of the new status in performing ongoing synchronization. Further, the agent 110 receives acknowledgment back from the voice-mail server 200. This notification and response may be performed in any suitable manner. Illustratively, it may be performed using an "ACK" and "NAK" protocol. That is, upon receipt of the notification of status change from the workstation 101, the voice-mail server 200 sends an ACK back, indicating that the voice-mail server 200 received the notice of status change and effected the change.

It should be recognized that, when the agent 110 is off-line, the agent 110 will not try to notify the voice-mail server 200, but rather will simply remember the changes in status of messages. However, when the agent 110 is again in connection with voice-mail server 200, the agent 110 will send notification of the status change of a message to the voice-mail server 200. If the voice-mail server 200 sends an ACK in response, the agent 110 will tag the message as synchronized upon receipt of the ACK. Thus, the voice-mail server 200 basically says it has applied the new status.

As should be apparent, the synchronization process as described above is very robust. This is because if the ACK or NAK is not received, then the agent 110 would try again at a later time. The agent 110 will keep trying until it gets the ACK from the voice-mail server 200. In the common situation, the ACK will reflect that the new status was applied. However, the ACK may also reflect the deletion of the message. Additionally, it does not matter whether the agent 110 sends a request again, which has previously been acknowledged. That is, for example, if the voice-mail server 200 actually acted upon the request from the agent 110, but somehow failed to send back an ACK. Rather, upon receipt of the second notification from the agent 110, the voice-mail server 200 will simply check again that the status of the given message in the voice-mail message store 220 is consistent with the notification.

Figure 6:
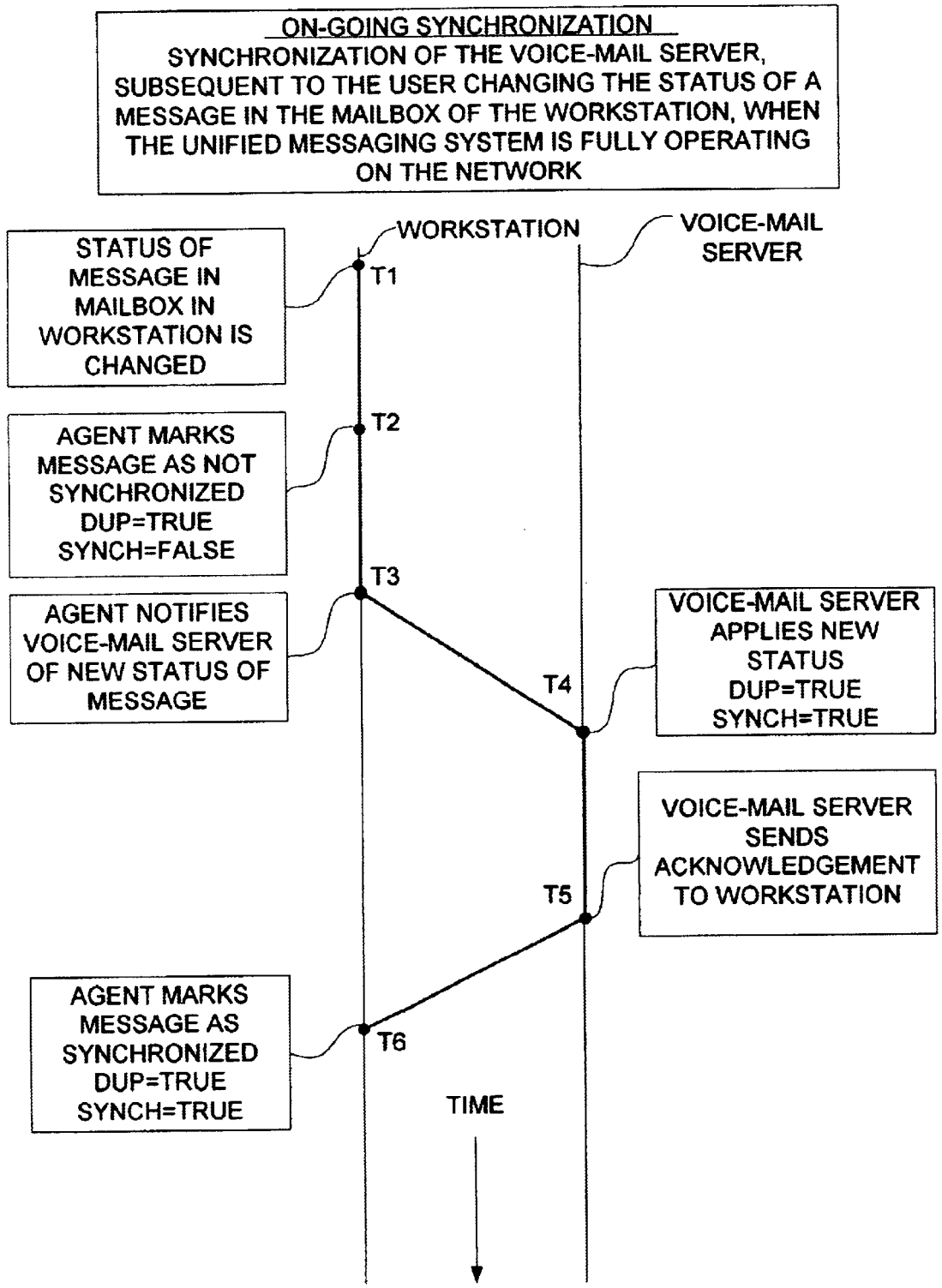
FIG. 6 is a diagram showing the synchronization of the voice-mail server, subsequent to the user changing the status of a message in the mailbox of the workstation, when the unified messaging system is fully operating on the network in accordance with the system and method of the invention.

In further explanation, FIG. 6 is a diagram illustrating the synchronization of the voice-mail server, subsequent to the user changing the status of a message in the mailbox in the workstation, when the unified messaging system is fully operating on the network. FIG. 6, as well as FIG. 7 described below, assumes that the message being synchronized was previously replicated in the past.

At the time $T_1$, the status of the message in the mailbox in the workstation is changed. Then, at time $T_2$, the agent in the workstation marks the message as not synchronized. Then, at time $T_3$, the agent notifies the voice-mail server regarding the new status of the message. At time $T_4$, the voice-mail server applies the new status and set the message flags to (Dup=True) and (Synch=true). Then, at time $T_5$, the voice-mail server sends acknowledgement of receipt of the change in status to the workstation. Then, at time $T_6$, the agent marks the message as synchronized, i.e., the agent sets the message flags (Dup=True) and (Synch=true).

Figure 7:
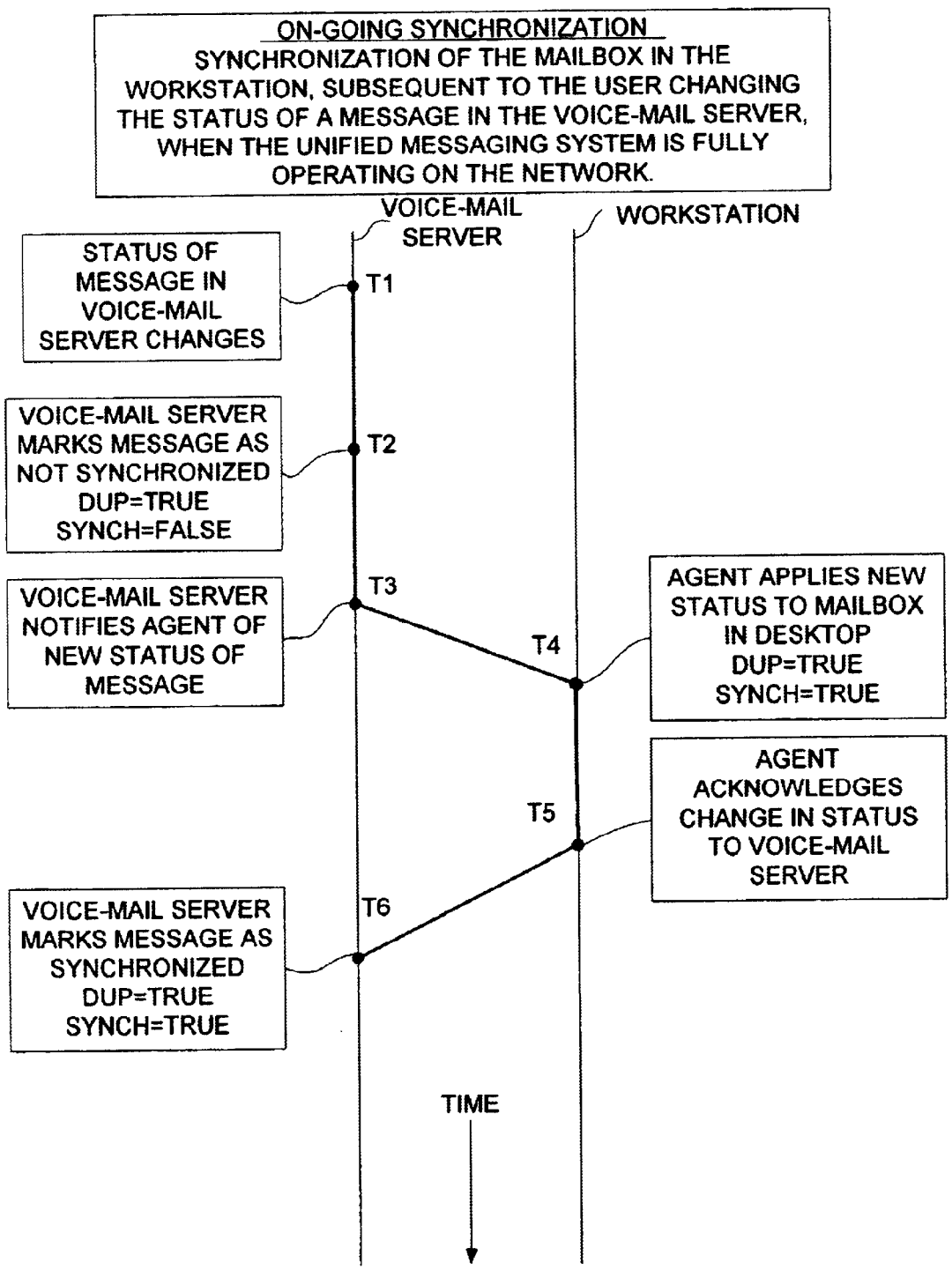
FIG. 7 is a diagram showing the synchronization of the mailbox in the workstation, subsequent to the user changing the status of a message in the voice-mail server, when the unified messaging system is fully operating on the network in accordance with the system and method of the invention.

Further, FIG. 7 is a diagram showing the synchronization of the workstation mailbox 150 in the workstation 101 and the voice-mail message store 220 in the voice-mail server 200, subsequent to the user changing the status of a message in the voice-mail server when the unified system is fully operating on the network. Thus, FIG. 7 shows an on-going synchronization process. In time $T_1$, the status of the message in the voice-mail server is changed. Then, at time $T_2$, the voice-mail server marks the message as not synchronized, i.e., sets the message flags as (Dup=True) and (Synch=False). At time $T_3$, the voice-mail server notifies the agent of the new status of the message.

Then, at time $T_4$, the agent applies the new status to the mailbox in the workstation and sets the message flags as (Dup=True) and (Synch=true). At time $T_5$, the agent acknowledges change in status to the voice-mail server. Then, at time $T_6$, the voice-mail server marks the message as synchronized, i.e., sets the message flags (Dup=True) and (Synch=true).

Accordingly, FIG. 6 shows when a change occurs in the workstation. In contrast, FIG. 7 shows the scenario when a change occurs in the voice-mail server. Accordingly, the roles in FIG. 6 and FIG. 7 are reversed. It should be recognized that the on-going synchronization processes shown in FIGS. 6 and 7 could occur simultaneously in the unlikely situation where the two copies corresponding to the same message would be manipulated simultaneously from both the workstation and the telephone.

Figure 8:
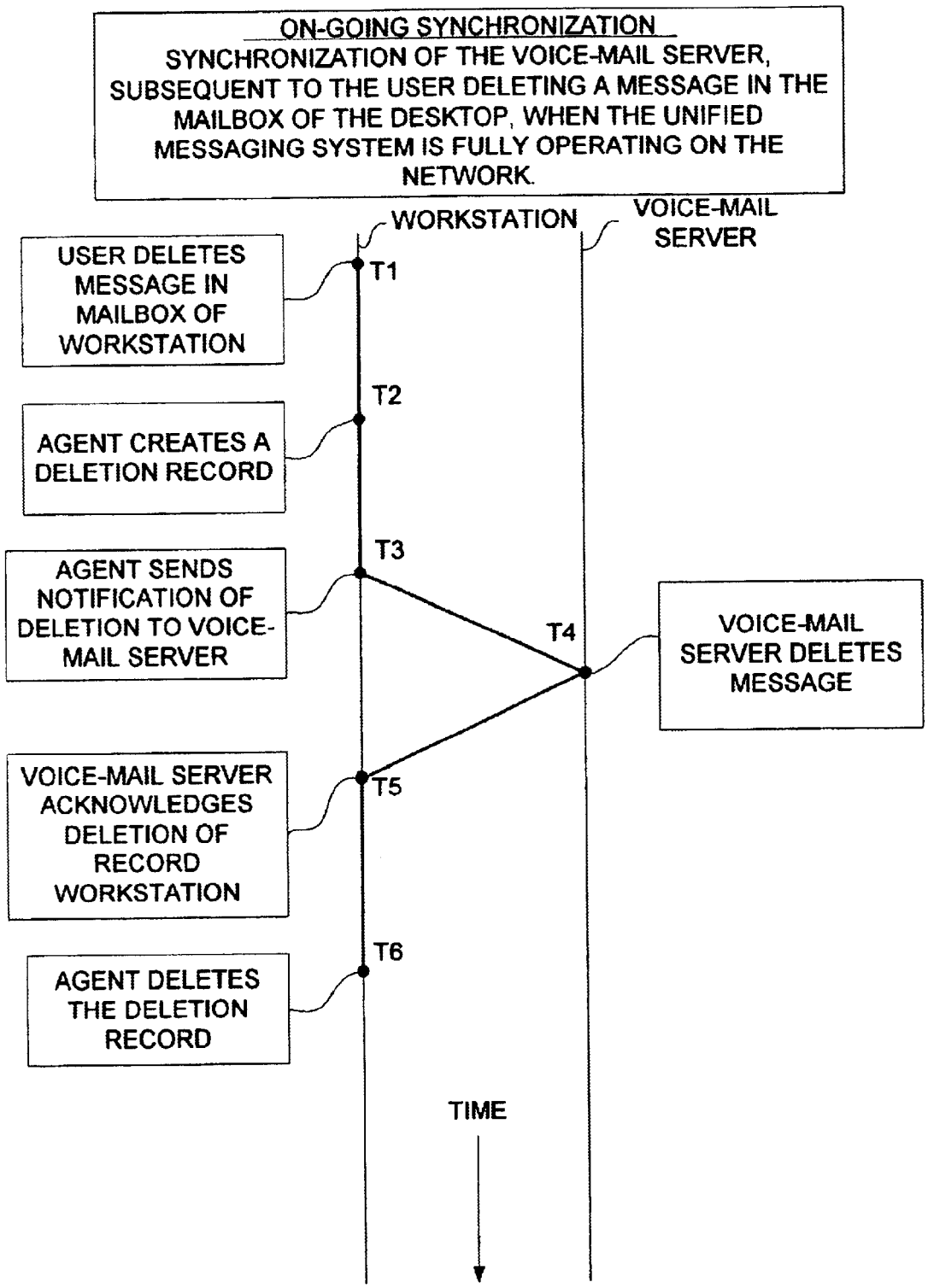
FIG. 8 is a diagram showing the synchronization of the voice-mail server, subsequent to the user deleting a message in the mailbox of the workstation, when the unified messaging system is fully operating on the network in accordance with the system and method of the invention.
Figure 9:
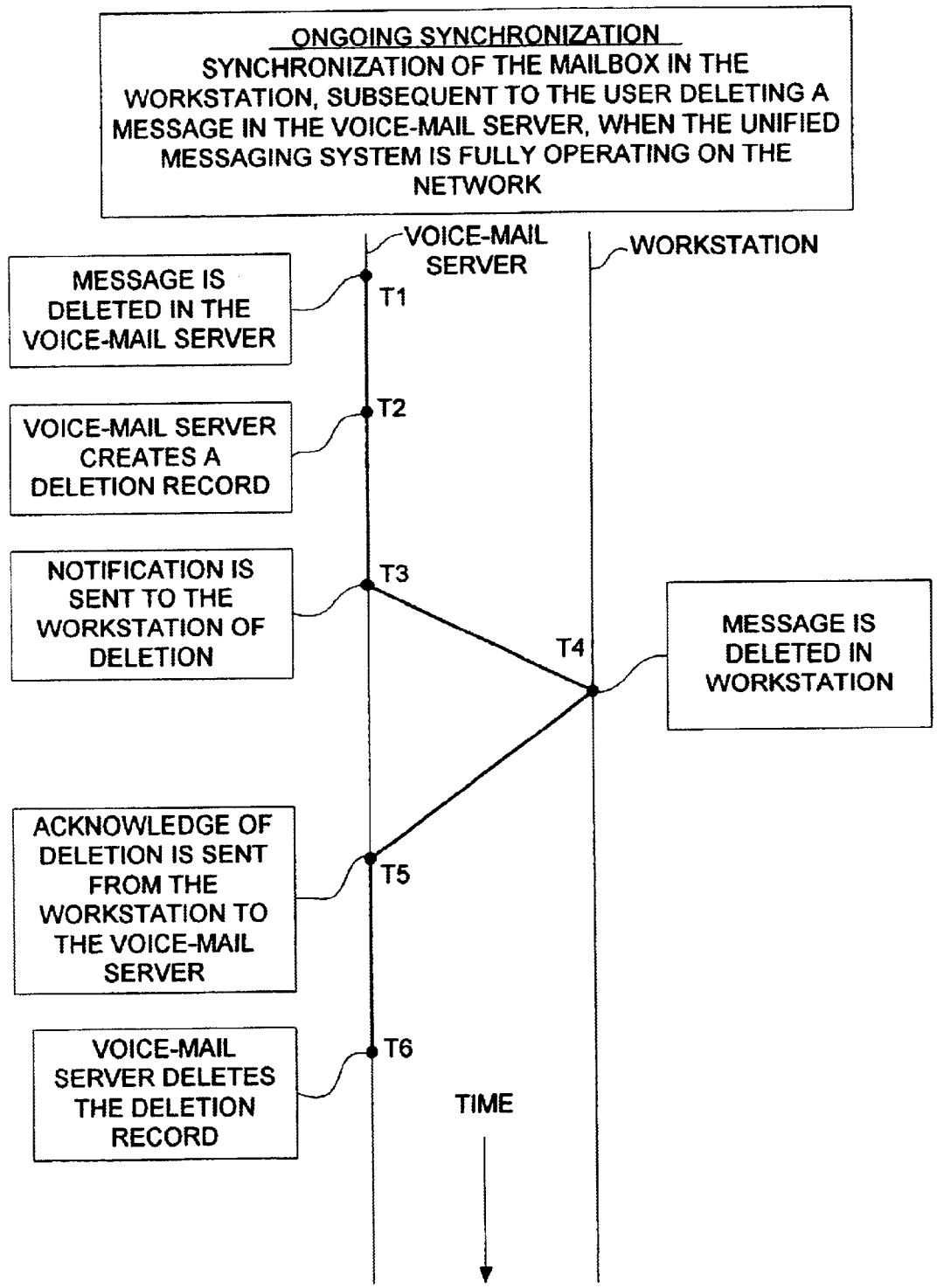
FIG. 9 is a diagram showing the synchronization of the mailbox in the workstation, subsequent to the user deleting a message in the voice-mail server, when the unified messaging system is fully operating on the network in accordance with the system and method of the invention.

FIGS. 8 and 9 illustrate the ongoing synchronization of deletions of messages. Specifically, FIG. 8 is a diagram showing the synchronization of the voice-mail server, subsequent to the user deleting a message in the mailbox of a workstation when a unified messaging system is fully operating on the network. At time $T_1$, the user, i.e., the workstation client deletes a message in the mailbox in the workstation. Then, at time $T_2$, the agent creates a deletion record. At time $T_3$, the agent sends notification of the deletion of the message to the voice-mail server. Then, at time $T_4$, the voice-mail server deletes the message. Then, at time $T_5$, the voice-mail server acknowledges deletion of the message to the workstation. At time $T_6$, the agent receives an acknowledgement of deletion of the message and deletes the deletion record.

As shown in FIG. 8, the deletion is performed on the workstation and the voice-mail server is notified. It should be recognized that conventional e-mail applications commonly have one "in-box" into which e-mail messages are initially deposited. However, a user may move e-mail messages out of the in-box into any number of specialized folders, which the user can create. An example of this arrangement is Microsoft® OUTLOOK. In accordance with one embodiment of the invention, only the contents of the inbox are synchronized. Thus, FIG. 8 illustrates the deletion of an e-mail. However, if the e-mail is moved out of the in-box, in accordance with this embodiment of the invention, the e-mail is essentially deleted. Further, it should be appreciated that in this embodiment, only the status of a message is synchronized, not the contents of the e-mail, i.e., such as the header, body or attachments. However, it should be appreciated that various other attributes of the e-mail message and the voice-mail message may be synchronized, using the system and method of this invention, based on the particular needs of the user.

Further, FIG. 9 is a diagram showing the synchronization of the mailbox and the workstation, subsequent to the user deleting a message in the voice-mail server, when the unified messaging system is fully operating on the network. At time $T_1$, the message is deleted in the voice-mail server. Then, at time $T_2$, the voice-mail server creates a deletion record as a result of the deletion of the message. Then, at time $T_3$, notification is sent from the voice-mail server to the workstation indicating the deletion. Then, at time $T_4$, the message is deleted in the workstation, and specifically in the mailbox of the workstation. Then, at time $T_5$, acknowledgement of the deletion is-sent from the workstation to the voice-mail server. At time $T_6$, the voice-mail server deletes the deletion record.

It should be recognized that whenever a communication is attempted between the workstation 101 and the voice-mail server 200, for example, it may be necessary to reexecute the protocol, because various things may occur to interfere with the communication. For example, the network may be down. To address this concern, the system and method of the invention creates a deletion record. Accordingly, if a message is deleted in the workstation 101, the workstation 101 will send notification to the voice-mail server 200. If the network goes down, for example, the workstation is effectively in stand-alone mode and the notification will never reach the voice-mail server 200 and the voice-mail server 200 will not ACK. However, the deletion record allows the workstation 101 to re-send the notification once the workstation 101 is again in connection with the voice-mail server 200.

Figure 10:
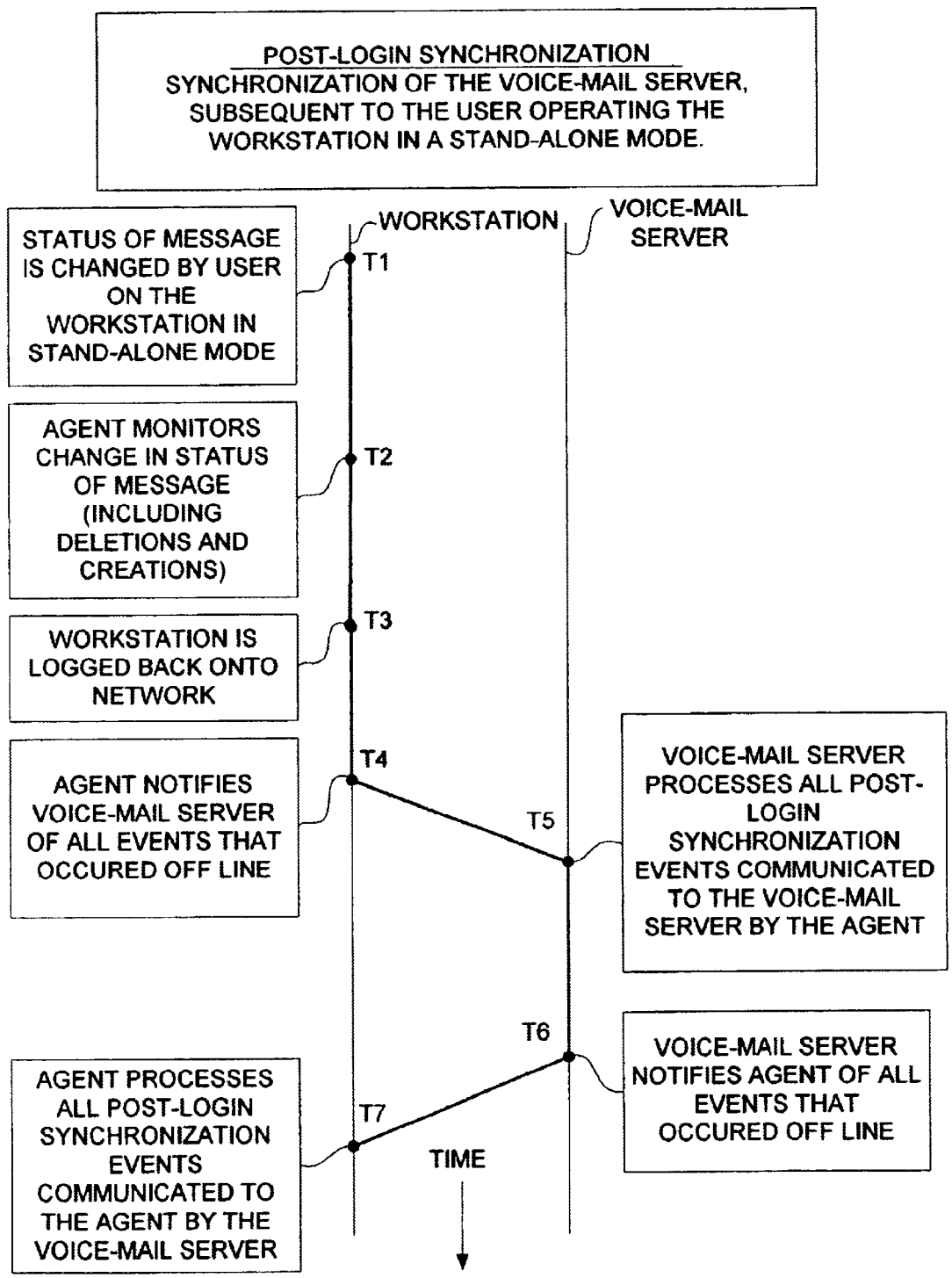
FIG. 10 is a diagram showing the synchronization of the voice-mail server, subsequent to the user operating the workstation in a stand-alone mode, in accordance with the system and method of the invention.

In further explanation, FIG. 10 is a diagram showing the synchronization of the voice-mail server subsequent to the user operating the workstation in a stand-alone mode. Specifically, the workstation is operated while not connected to the voice-mail server. At time $T_1$, the status of a message on the workstation is changed by a user on the workstation in stand alone mode. Then, at time $T_2$, the agent monitors the time and status of the message. As a result, in time $T_2$ new messages are marked as not duplicated. Additionally, already duplicated messages that have been subject to changes (new→old, old→new) are also marked as not synchronized.

After time $T_2$, at time $T_3$, the workstation is logged back onto the network, i.e., the workstation is operationally connected to the voice-mail server. Then, at time $T_4$, the agent notifies the voice-mail server of all events that have occurred off-line. Specifically, the agent in the workstation notifies the voice-mail server of all changes in status of message including creations and deletions. Then, at time $T_5$, the voice-mail server processes all the post-login synchronization events communicated to the voice-mail server by the agent. Then at time $T_6$, the voice-mail server notifies the agent of all events that occurred off-line. Then, at time $T_7$, the agent processes all the post-login synchronization events communicated to the agent by the voice-mail server.

FIG. 10 illustrates a situation when the workstation 101 is not logged on to the voice-mail server 200. For example, the workstation client using the workstation 101 may be traveling, the network may be down, or the voice-mail server may be down. As a result, when the user is using the workstation in stand alone mode, the agent 110 monitors the events in the workstation mailbox 150. If a new e-mail arrives from the e-mail server or a voice-mail is created in the workstation mailbox (e.g., moved from a folder to the in-basket), that message is marked as not duplicated. Additionally, if the status of a message changes in the workstation 101, that message is also marked as not synchronized. A specific case of this is when a message is deleted. In this case, when the message is deleted, a deletion record is created.

At some point in time, the agent 110 in the workstation 101 will eventually log into the voice-mail server 200. At this point in time, a post-login synchronization will be performed. Specifically, all events which occurred while the workstation 101 was off-line will be notified to the voice-mail server 200. The agent 110 can perform the post-log in synchronization because the agent 110 will remember what has happened to all the messages. Also, the voice-mail server 200 can perform the post-log in synchronization because the voice-mail server 200 will remember what has happened to all the messages. For each event, the handshake occurs in the post-log in synchronization the same way as if the event had occurred while the workstation 101 and the voice-mail server 200 were connected.

FIGS. 2–10 illustrate various aspects of the system and method of the invention. However, it should be appreciated that the aspects of the invention illustrated in FIGS. 2–10 are merely examples. Thus, FIGS. 2–10 are merely illustrative and exemplary of the present invention and are made merely of purposes of providing a full and enabling disclosure of the invention. Accordingly, FIGS. 2–10, as well as FIGS. 11–24 discussed below are not intended or are to be construed to limit the present invention or otherwise to exclude other embodiments, adaptations, variations, modifications and equivalent arrangements.

In conventional e-mail systems, an e-mail message is initially generated and stored on the e-mail server. Once accessed by the user, the e-mail is moved to an e-mail service provider and, as a result, is removed from the e-mail server. Alternatively, the e-mail may simply be displayed on the e-mail service provider, while maintaining storage of the e-mail on the e-mail server.

If the e-mail is simply displayed, a workstation client will observe a visual representation, on the workstation client's workstation, of the e-mail in the e-mail database. When the workstation client accesses the e-mail to display it on the screen, the data is obviously blocked. That is, the data generating the e-mail is still in the e-mail server's database, but is brought into the e-mail service provider to render or present the data.

If the e-mail is simply displayed, in accordance with one embodiment of the invention, there is no replication of an e-mail message between the workstation mailbox and the database of the e-mail server. Rather, the e-mail replication occurs between the workstation mailbox and the voice-mail server database. Accordingly, the invention may be characterized as being independent to whether the e-mail is moved to an e-mail service provider and removed from the e-mail server, or alternatively, whether the e-mail is simply displayed on the workstation by the e-mail service provider, while maintaining storage of the e-mail on the e-mail server.

The unified messaging in accordance with the invention may be enhanced with additional features. For example, when a telephone client deletes a message using the telephone, that deletion will be synchronized with the workstation mailbox. That is, that message will also be deleted from the workstation mailbox. However, the workstation may move the deleted message to a deleted items folder in the workstation mailbox. The feature is present in Microsoft® OUTLOOK. As a result, the user may change her mind at a later time and retrieve the previously deleted message.

In accordance with the system and method of the invention, the agent and the voice-mail server perform incremental synchronization processes to monitor changes in message status and deletion. FIGS. 11–15 describe further aspects of the invention including the incremental synchronization processes.

Figure 11:
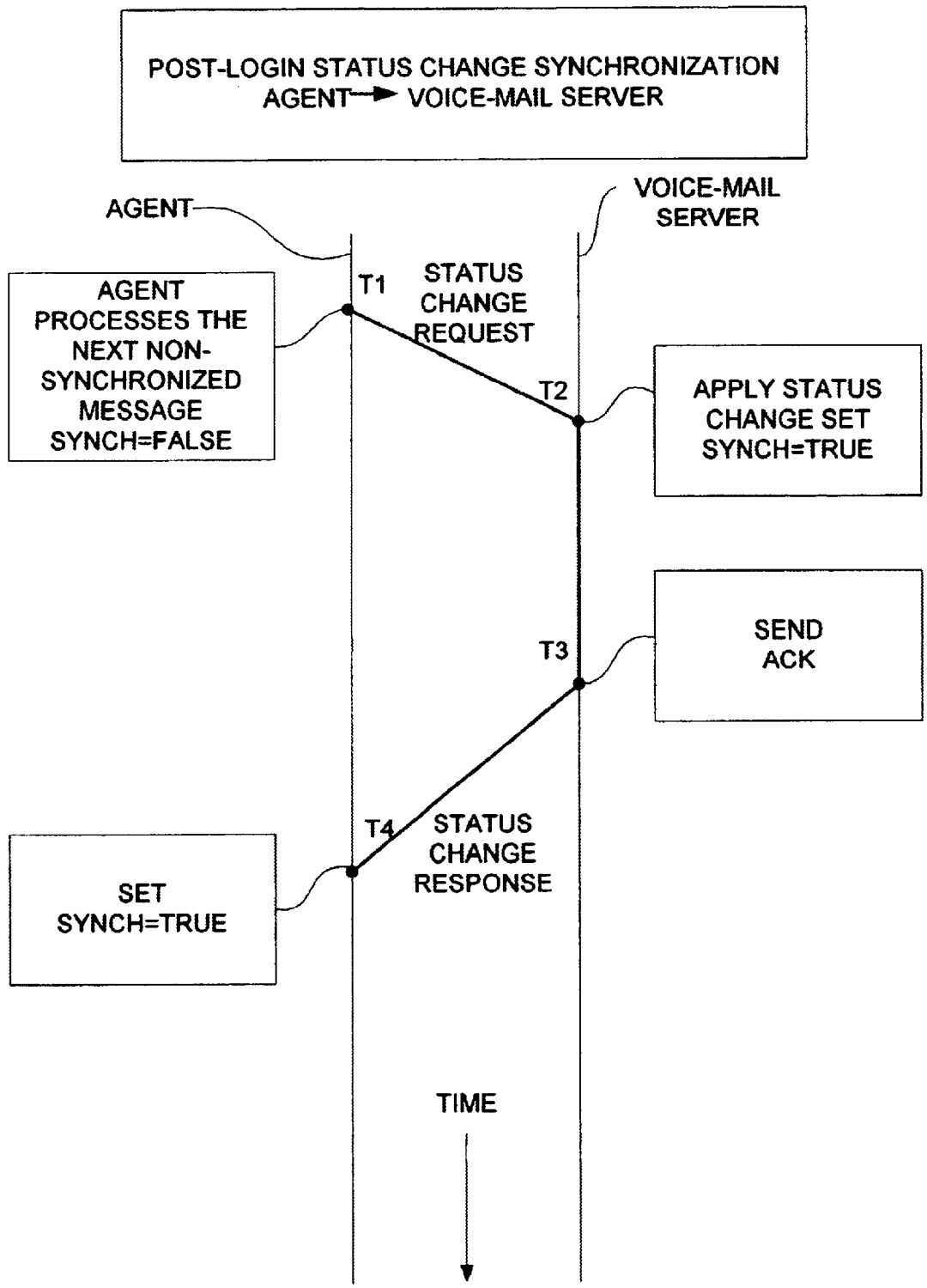
FIG. 11 is a diagram showing the post-login status change synchronization of the agent with the voice-mail server in accordance with the system and method of the invention.

FIG. 11 illustrates a post-login status change synchronization by the agent with the voice-mail server. At time $T_1$, the agent processes the next non-synchronized message (e.g., Synch=False). The agent sends a status change request. At time $T_2$, the voice-mail server applies the status change and sets the message flag (Synch=True). Then, at time $T_3$, the voice-mail server sends an acknowledgement to the agent. At time $T_4$, the agent sets the message flag as (Synch=True).

Figure 12:
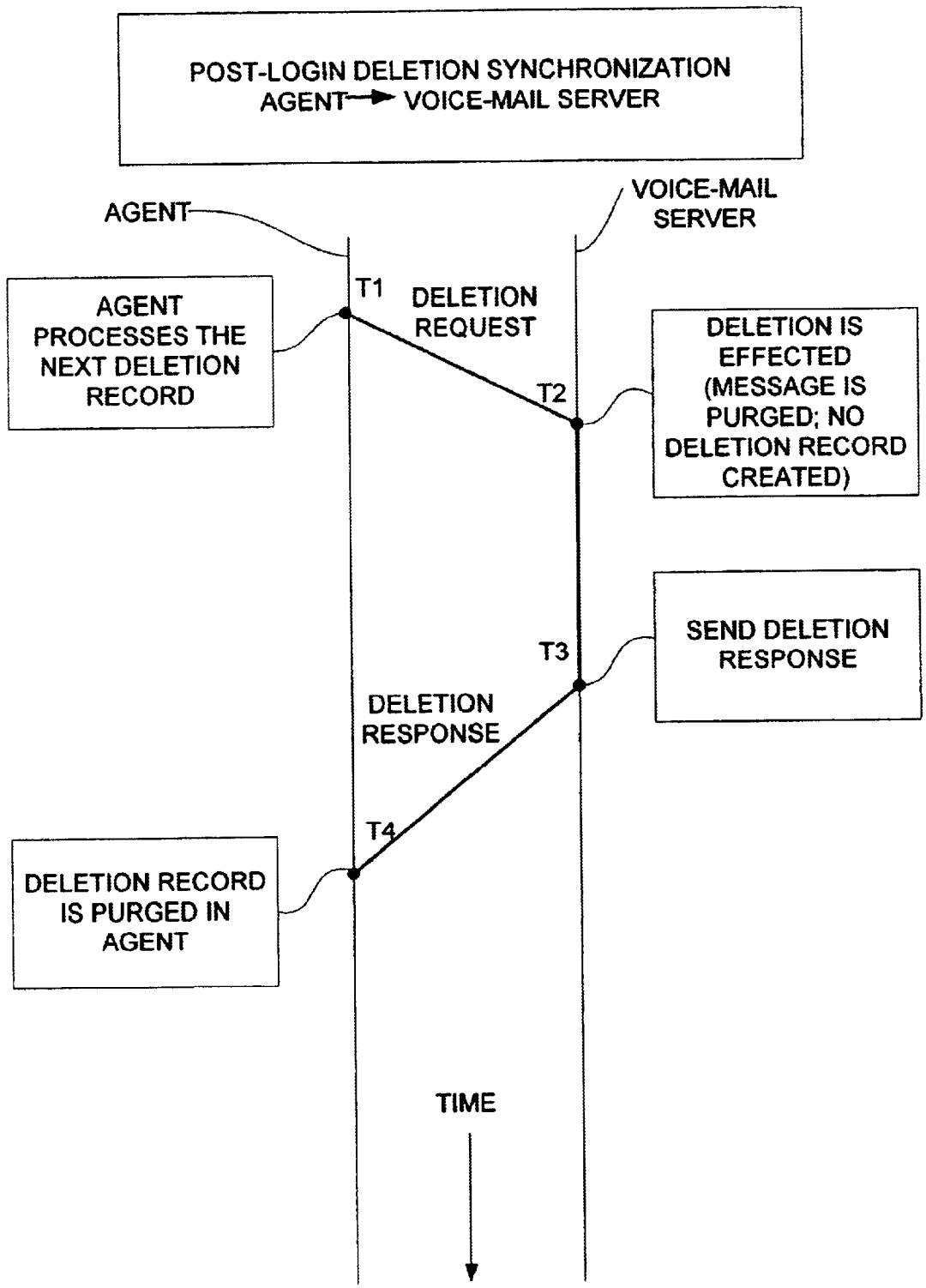
FIG. 12 is a diagram showing the post-login deletion synchronization of the agent with a voice-mail server in accordance with the system and method of the invention.

FIG. 12 is a diagram illustrating a post-login deletion synchronization by the agent with the voice-mail server. At time $T_1$, the agent processes the next deletion record. The agent sends the voice-mail server a deletion request. Then at time $T_2$, the voice-mail server effects the deletion. That is, the message is purged in the voice-mail server and no deletion record is created. Then, at time $T_3$, the voice-mail server sends a deletion response. At time $T_4$, the deletion record is purged in the agent.

Figure 13:
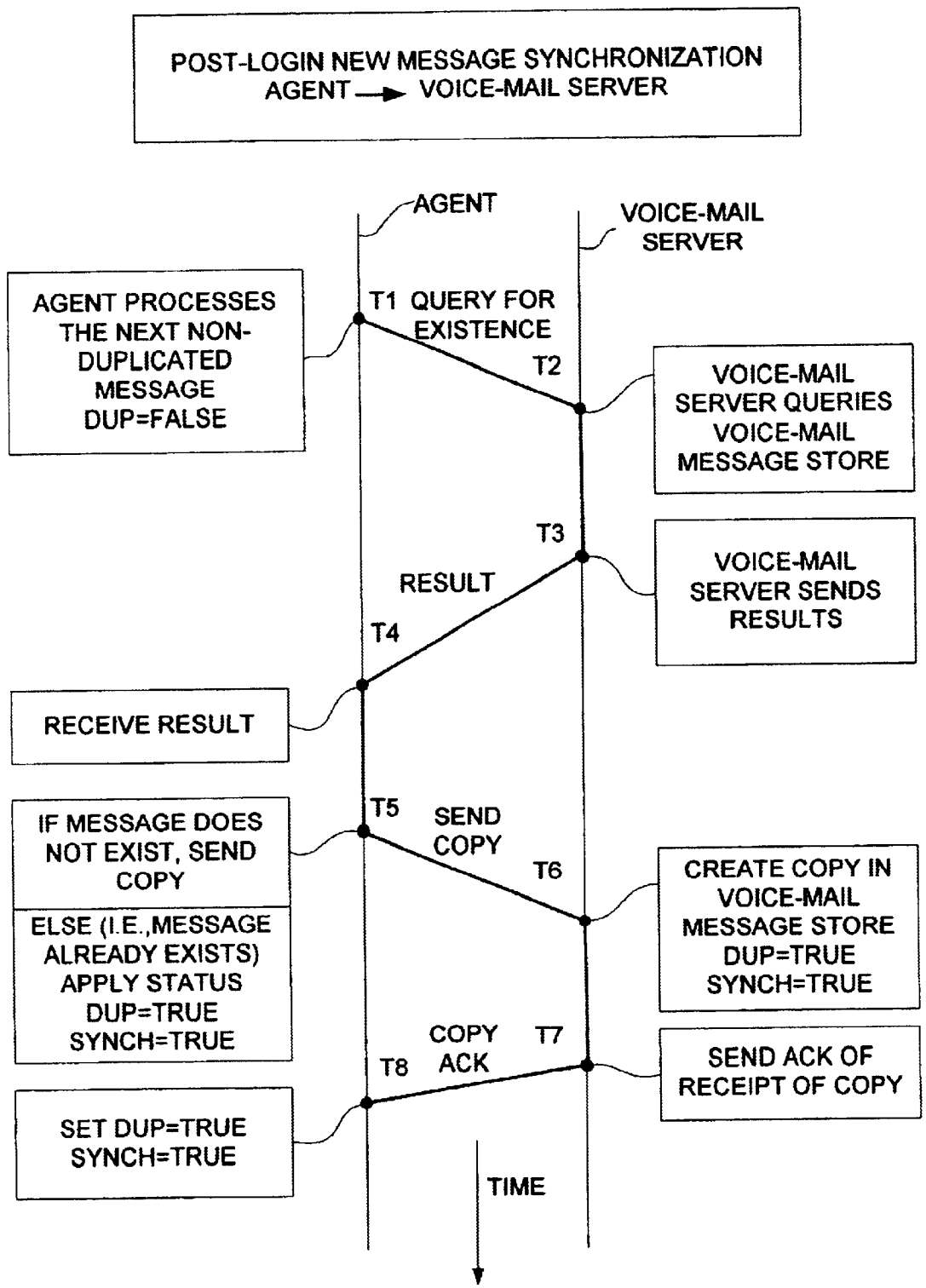
FIG. 13 is a diagram showing the post-login new message synchronization of the agent with the voice-mail server in accordance with the system and method of the invention.

FIG. 13 is a diagram illustrating a post-login new message synchronization by the agent with the voice-mail server. At time $T_1$, the agent processes the next non-duplicated message (e.g., Dup=False). The agent queries the voice-mail server for existence of the message. Then, at time $T_2$, the voice-mail server queries the voice-mail message store. At time $T_3$, the voice-mail server sends the result to the agent. At time $T_4$, the agent receives the result. Then, at time $T_5$, if the message does not exist in the voice-mail server, the agent sends the voice-mail server a copy. Otherwise, i.e., the message already exists, the agent applies a new status to the message (Dup=True) and (Synch=True).

As shown in FIG. 13, at time $T_6$, if the message did not exist in the voice-mail server, then the voice-mail server creates a copy in the voice-mail message store and sets the message flag as (Dup=True) and (Synch=True). Then, at time $T_7$, the voice-mail server sends acknowledgement of receipt of copy. At time $T_8$, the agent sets the message flag as (Dup=True) and (Synch=True).

Figure 14:
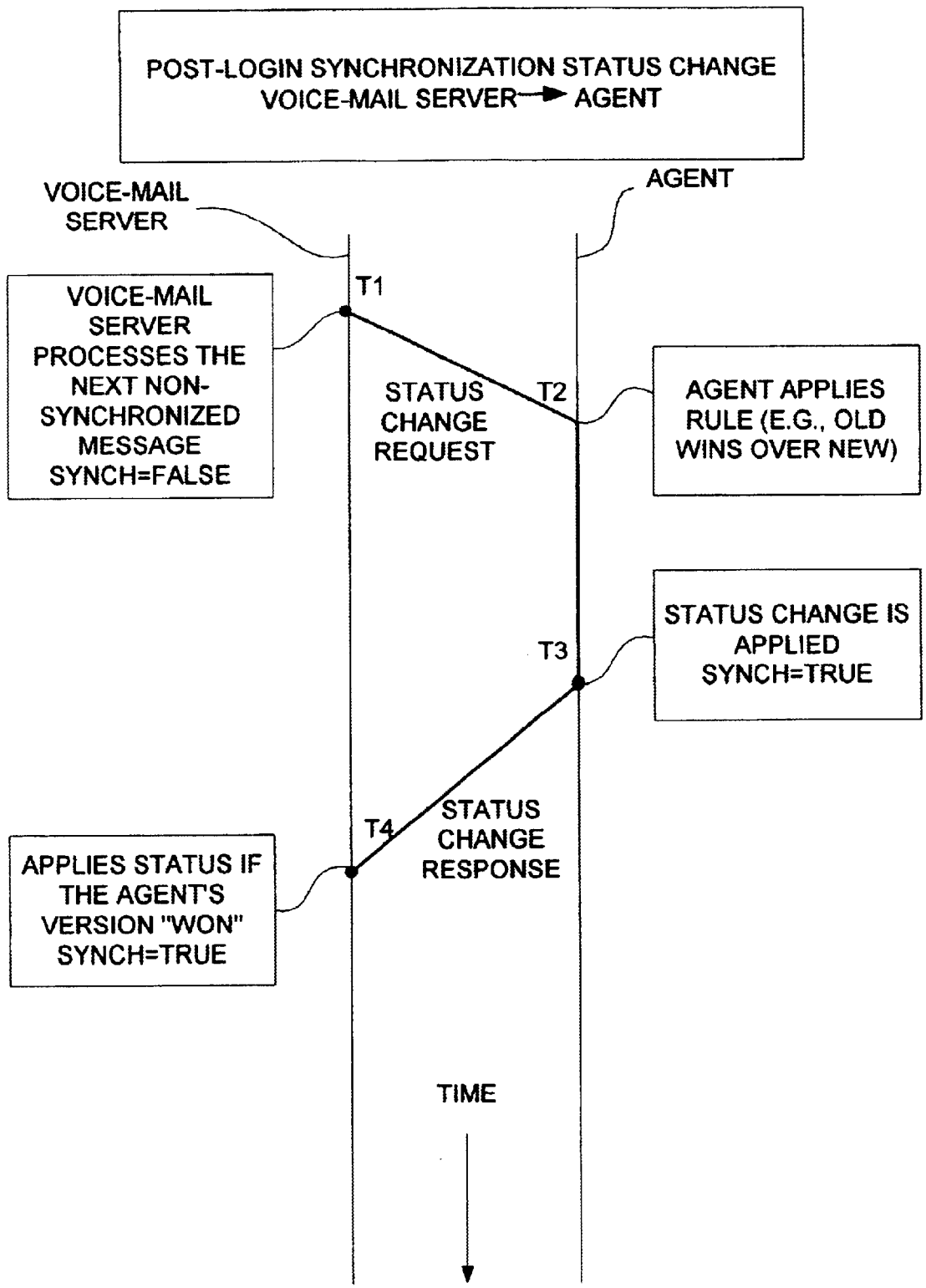
FIG. 14 is a diagram showing the post-login synchronization status change of the voice-mail server with the agent in accordance with the system and method of the invention.

FIG. 14 is a diagram illustrating the post-login synchronization status change of the voice-mail server with the agent. At time $T_1$, the voice-mail server processes the next non-synchronized message (Synch=False). The voice-mail server then sends a change request to the agent. Then, at time $T_2$, the agent applies the rule. For example, the agent applies the rule that an old message wins over a new message. Then, at time $T_3$, the status change is applied and the agent sets the message flag as (Synch=True). Then, the agent sends the status change request to the voice-mail server. At time $T_4$, the voice-mail server applies the status if the agents version "won" and sets the message flag (Synch=True).

Figure 15:
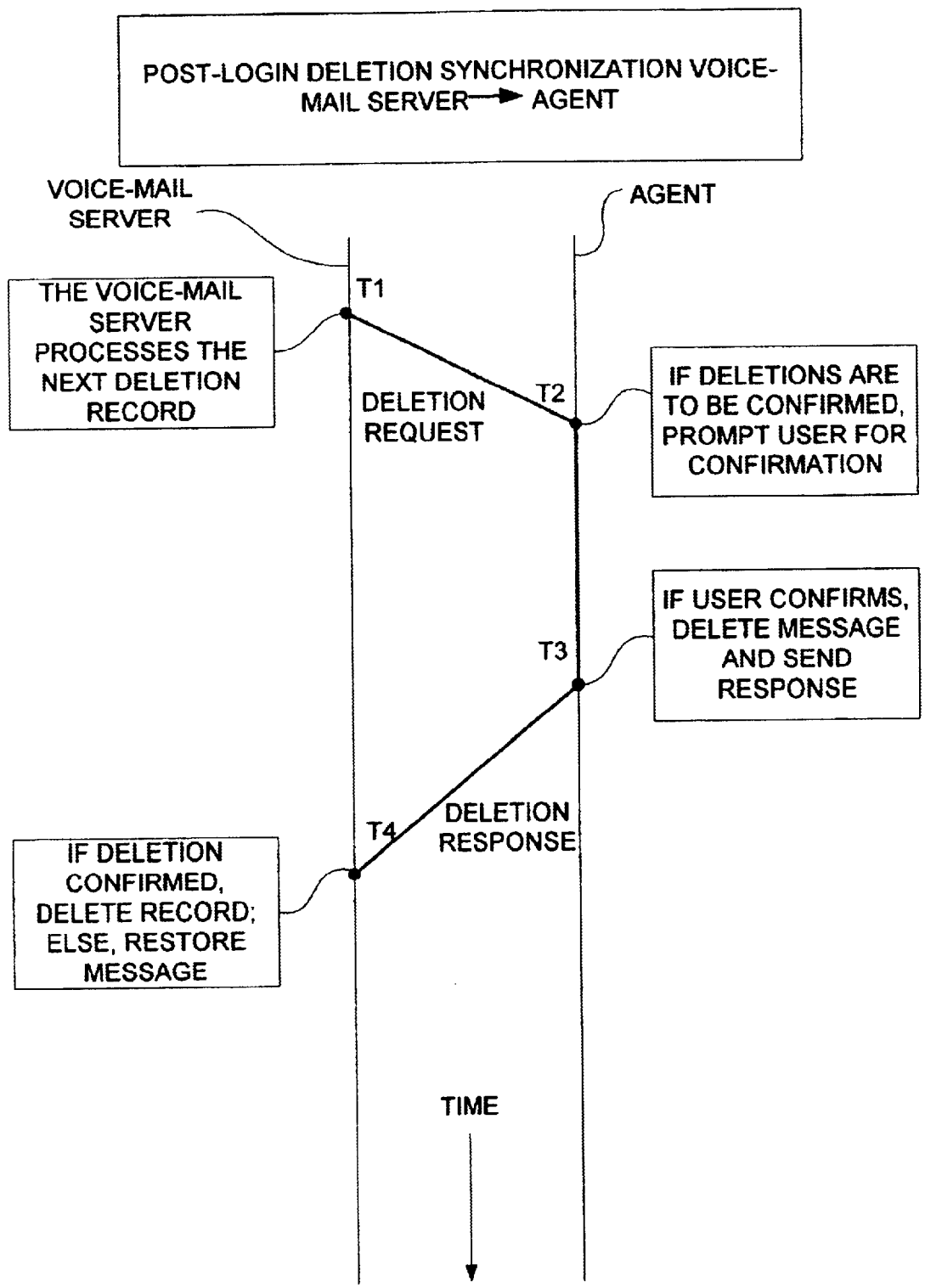
FIG. 15 is a diagram showing the post-login deletion synchronization of the voice-mail server with the agent in accordance with the system and method of the invention.

FIG. 15 is a diagram illustrating a post-login synchronization of the voice-mail server with the agent. At time $T_1$, the voice-mail server processes the next deletion record. The voice-mail server sends the agent a deletion request. At time $T_2$, if the deletions are to be confirmed, the agent prompts the user for confirmation. At time $T_3$, if the user confirms, the agent deletes the message and sends a deletion response to the voice-mail server. Then, at time $T_4$, the voice-mail server deletes the message if deletion is confirmed by the agent and otherwise restores the message.

Further, the voice-mail server may also perform a process wherein the voice-mail server processes the next non-duplicated message (e.g., Dup=False). This process has been previously illustrated in FIG. 2. That is, FIG. 2 is a diagram illustrating post-login new voice-mail message synchronization by the voice-mail server with the agent in the workstation.

Accordingly, FIGS. 2–15 as described above illustrate various aspects of the system and method of the invention. Some operations pertain to on-going synchronization, while other operations pertain to post-login synchronization. Particularly, in accordance with aspects of the post-login synchronization, the post-login synchronization process may be initiated when the agent starts and subsequently logs onto the voice-mail server. As a result, the agent is in communication with the voice-mail server.

In the post-login synchronization process, both the agent and the voice-mail server synchronize respectively with each other. Accordingly, from the perspective of the agent, the agent gets all the messages in the workstation in-basket which have (Dup=True) and (Synch=False). For each such message, the agent sends the status change to the voice-mail server. In this manner, the agent synchronizes all status changes including new/old changes.

According to a further aspect of the post-login synchronization process, all deletions are synchronized. Specifically, the agent collects all the deletion records generated while the workstation was operating while not connected to the voice-mail server. For each deletion record, the agent sends a deletion record to the voice-mail sever.

In accordance with a further aspect of the post-login synchronization process, the agent collects all "new" messages not yet duplicated, i.e., (Dup=False). For each such message, the agent sends a copy of the message to the voice-mail server. In this manner, the agent synchronizes all new incoming messages.

In accordance with a further aspect of the post-login synchronization, the voice-mail server performs its post-login synchronization process. Similar to the post-login synchronization process performed by the agent, the voice-mail server communicates with the agent to synchronize all status changes, synchronize all deletions and synchronize all new incoming messages. As in the case with the agent, the voice-mail server may use an incremental synchronization process to perform the post-login synchronization.

Figure 16A:
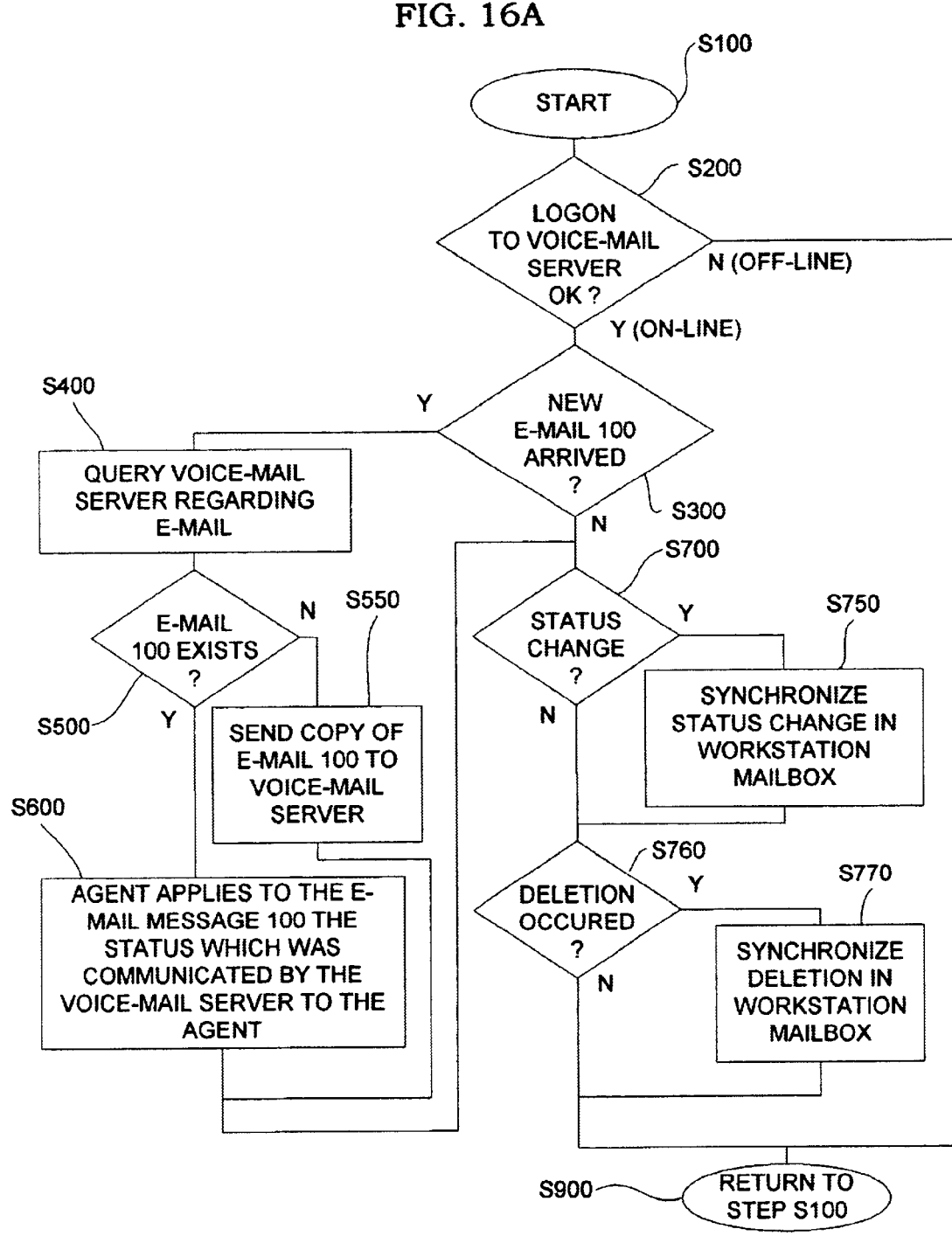
FIG. 16 is a flowchart showing operation of the agent in accordance with aspects of the system and method of the invention.
Figure 16B:
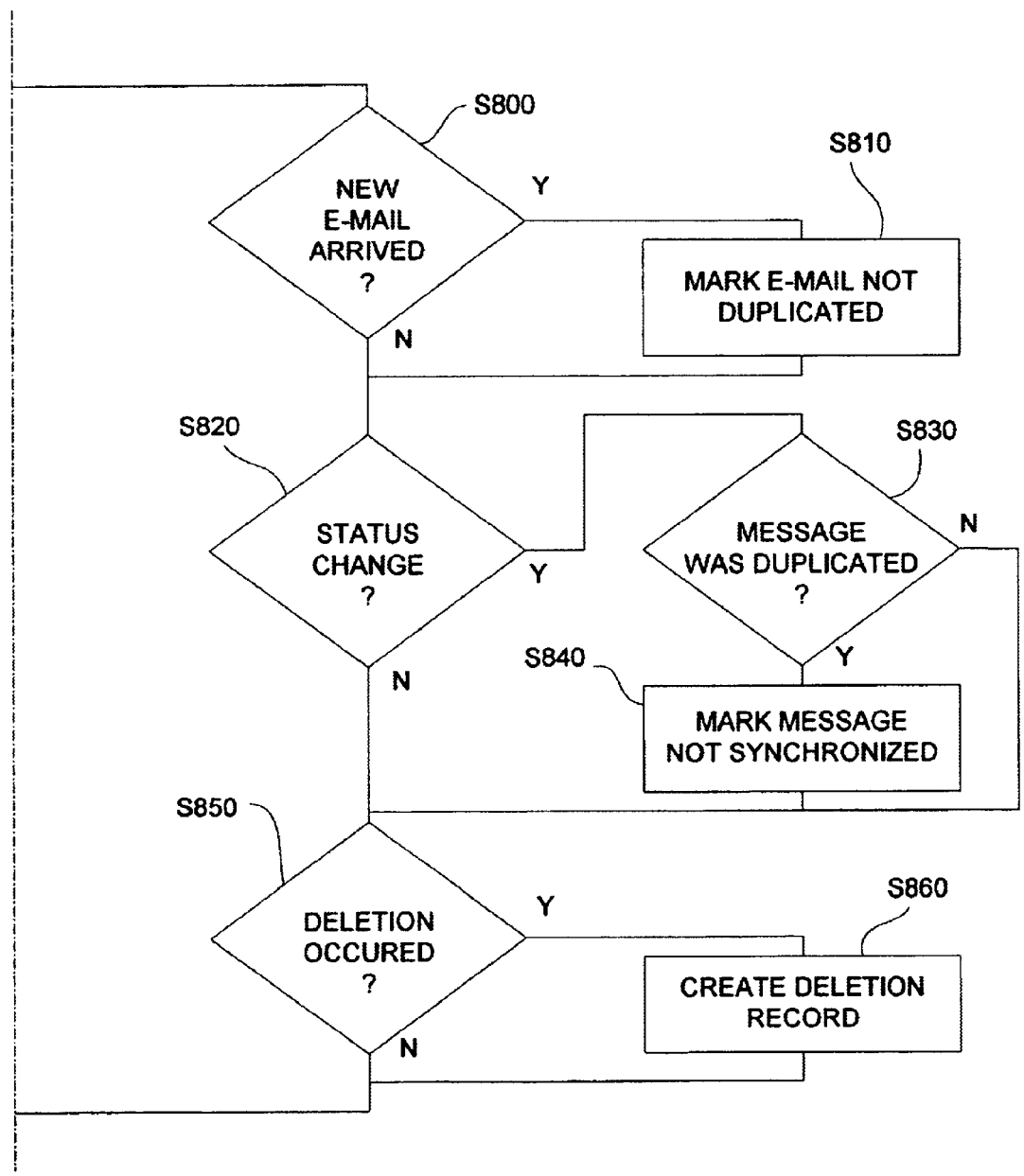

FIGS. 16–24 show exemplary embodiments of the method or process of the invention. In particular, FIG. 16 illustrates a process performed by the agent in accordance with the system and method of the invention. The process starts in step S1100. Then the process passes to step S200. In step S200, a determination is made whether the logon to the voice-mail server is successfully completed. If not, then the voice-mail server is off-line, and a process passes to step S800. In step S800, a determination is made whether a new e-mail has arrived. If yes, then in step S810, the new e-mail is marked as not duplicated. After step S810, the process passes to step S820.

Alternatively, if in step S800, a new e-mail has not arrived, then the process passes to step S820. In step S820, the agent determines there is a status change. If yes, then in step S830, the agent determines whether the message was duplicated. If yes, then in step S840, the agent marks the message as not synchronized. The process then passes to step S850.

Alternatively, if the message was not duplicated in step S830, then the process passes directly to step S850.

If in step S820, the agent determines whether there is no status change of the message, then the process passes directly to step S850.

In step S850, the agent determines whether a deletion occurred. If yes, then in step S860, the agent creates a deletion record. After step S860, the process passes to step S900. In step S900, the process returns to the start, i.e., step S100.

Alternatively, if in step S850, a deletion has not occurred, then the process also passes to step S900. In step S900, the process returns to the start, i.e., step S100.

If in step S200, the agent determines that the agent is on-line with the voice-mail server, then the process passes to step S300. In step S300, the agent determines whether a new e-mail 100 has arrived. If yes, then the process passes to step S400. In step S400, the agent queries the voice-mail server regarding the e-mail 100. Then in step S500, a determination is made whether the e-mail 100 exists in the voice-mail server. If no, then the agent sends a copy of the e-mail 100 to the voice-mail server in step S550.

Alternatively, in step S500, if the e-mail 100 does exist in the voice-mail server, then the process passes to step S600. That is, the e-mail 100 was retrieved by the proxy e-mail client (PEC). In step S600, the agent applies to the e-mail message 100 the status which was communicated by the voice-mail server to the agent.

After either step S550 or step S600, the process passes to step S700. In step S700, the agent determines whether the status of a message in the workstation mailbox has changed. If yes, then the process passes to step S750. In step S750, the agent synchronizes a status change in the workstation mailbox with the voice-mail server. The process then passes to step S760. Alternatively, in step S700, if there is not a status change in the workstation mailbox, then the process passes to step S760. In step S760, a determination is made whether a deletion occurred. If yes, the process passes to step S770. In step S770, the agent synchronizes the deletion in the workstation mailbox with the voice-mail server. Then, the process passes to step S900.

Alternatively, if in step S760 a deletion has not occurred, then the process passes to step S900. In step S900, the process returns to start, i.e., step S100.

Figure 17:
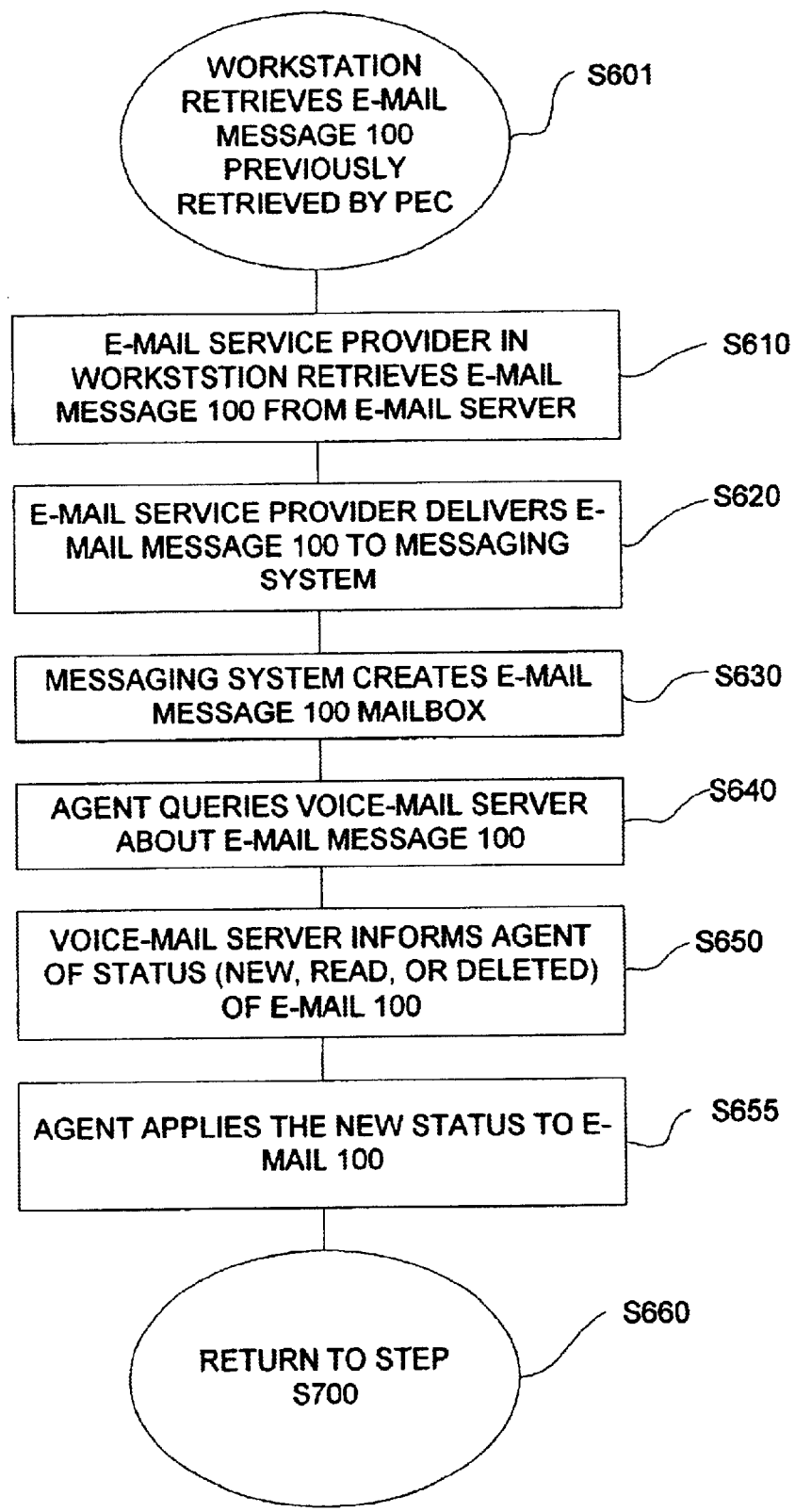
FIG. 17 is a flowchart showing the "workstation retrieves e-mail message 100 previously retrieved by proxy e-mail client (PEC)" step of FIG. 16 in accordance with the system and method of the invention.

FIG. 17 shows a process "workstation retrieves e-mail message 100 previously retrieved by the proxy e-mail client (PEC)" in further explanation of step S300 to step S600 of FIG. 16. The process begins in step S601. The process then passes to step S610.

In step S610, the e-mail service provider in the workstation retrieves the e-mail message 100 from the e-mail server. Then, in step S620, the e-mail service provider delivers the e-mail message 100 to the messaging sub-system. Then control passes to step S630. In step S630, the messaging sub-system creates e-mail message 100 in the mailbox. Then, in step S640, the agent queries the voice-mail server about the e-mail message 100. Then control passes to step S650.

In step S650, the voice-mail server informs the agent of the status of the e-mail message 100. Illustratively, the status may be that the message is new, read or deleted. After step S650, the process passes to step S655. In step S655 the agent applies the new status to e-mail 100. Then the process passes to step S660. In step S660, the process returns to step S700 of FIG. 16.

Figure 18:
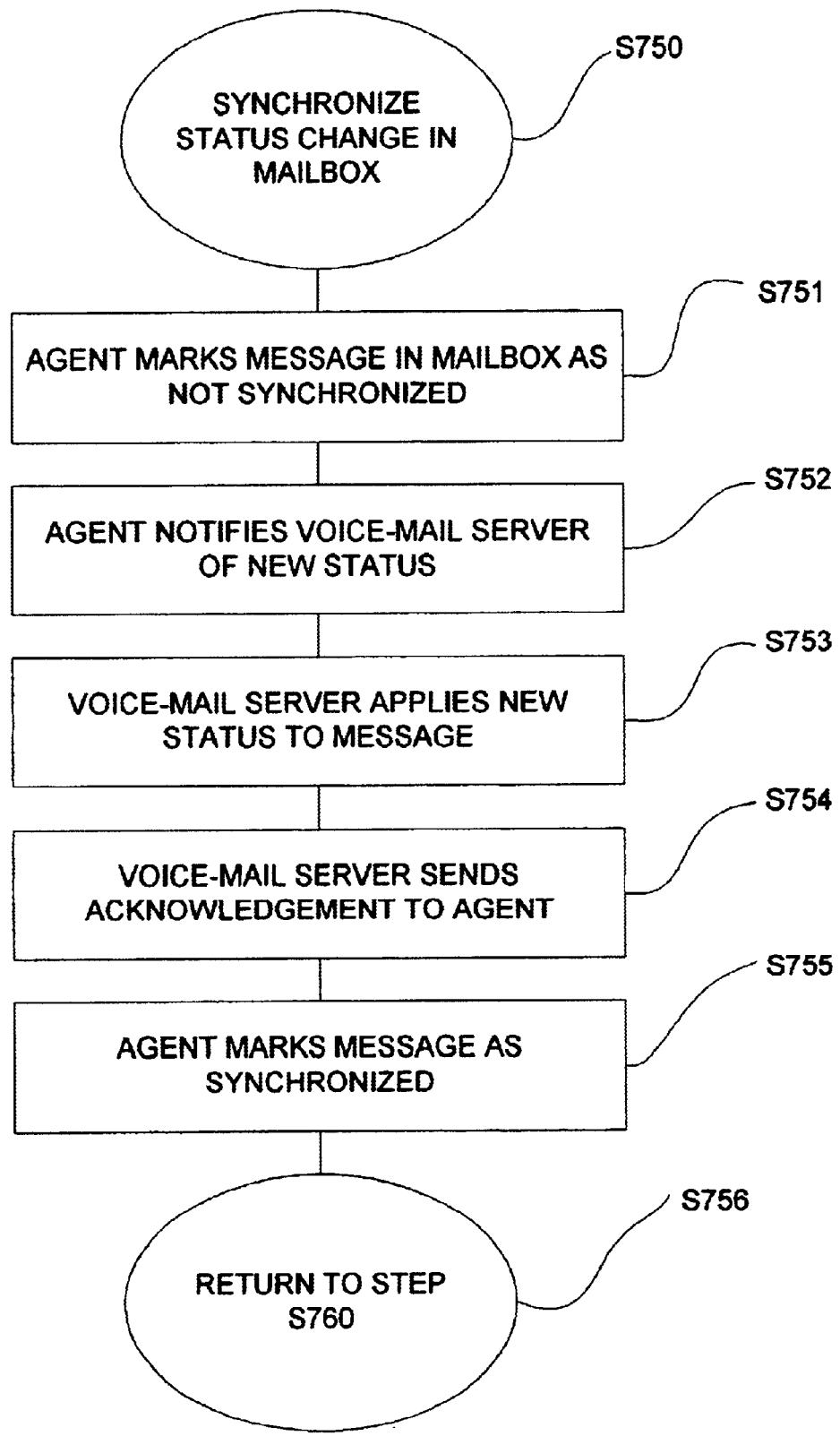
FIG. 18 is a flowchart showing the "synchronize status change in mailbox" step of FIG. 16 in accordance with the system and method of the invention.

FIG. 18 shows in further detail the "synchronize change in mailbox" step S750 of FIG. 16. The process starts in step S750. Control then passes to step S751. In step S751, the agent marks the message in the mailbox as not synchronized. Then, in step S752, the agent notifies the voice-mail server of the new status. Control then passes to step S753.

In step S753, the voice-mail server applies the new status to the message. Then control passes to step S754. In step S754, the voice-mail server send acknowledgement to the agent. Then, in step S755, the agent marks the message as synchronized. Then control passes to step S756. In step S756, the process returns to step S760 in FIG. 16.

Figure 21:
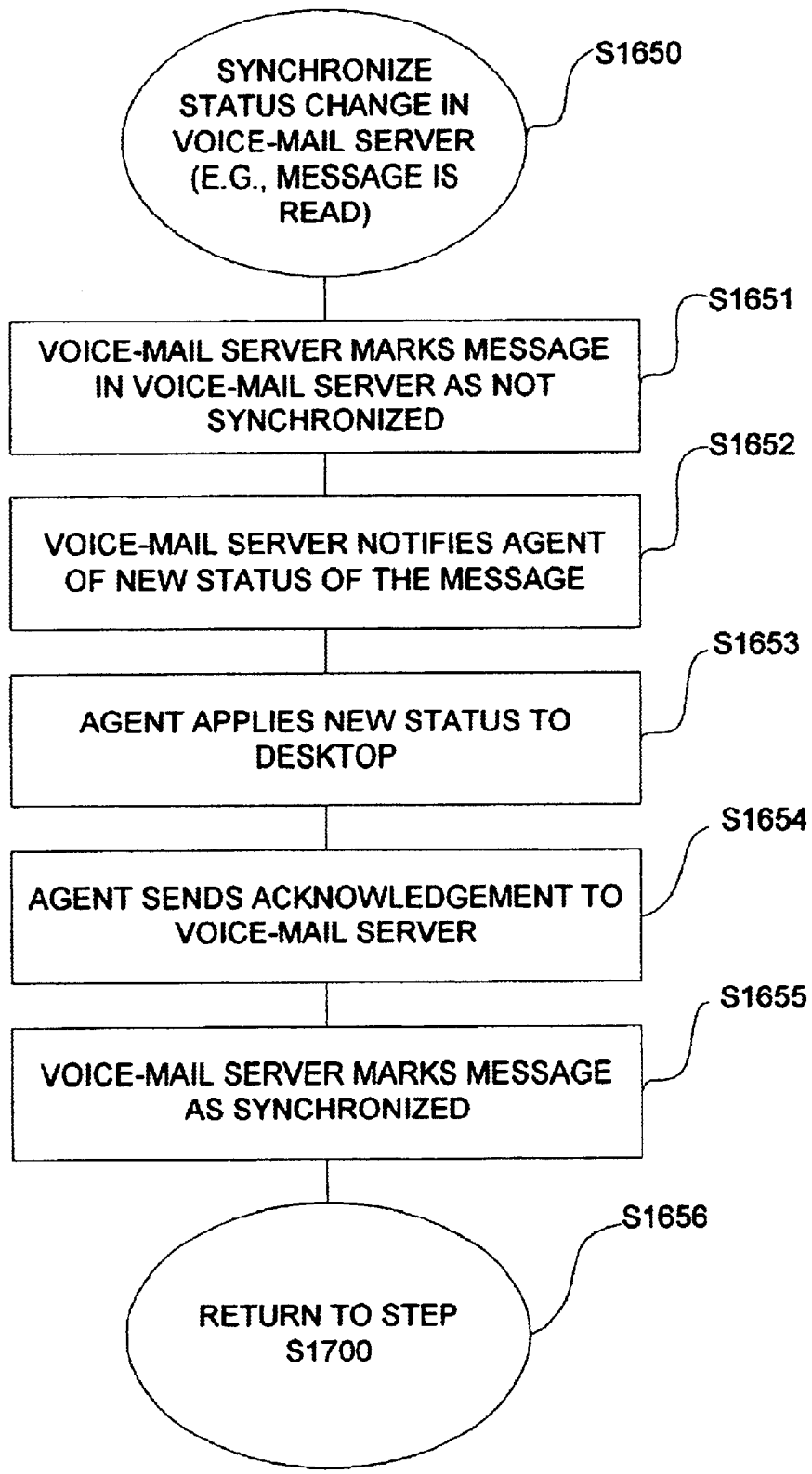
FIG. 21 is a flowchart showing the "synchronize status change in voice-mail server" step of FIG. 20 in accordance with the system and method of the invention.
Figure 22:
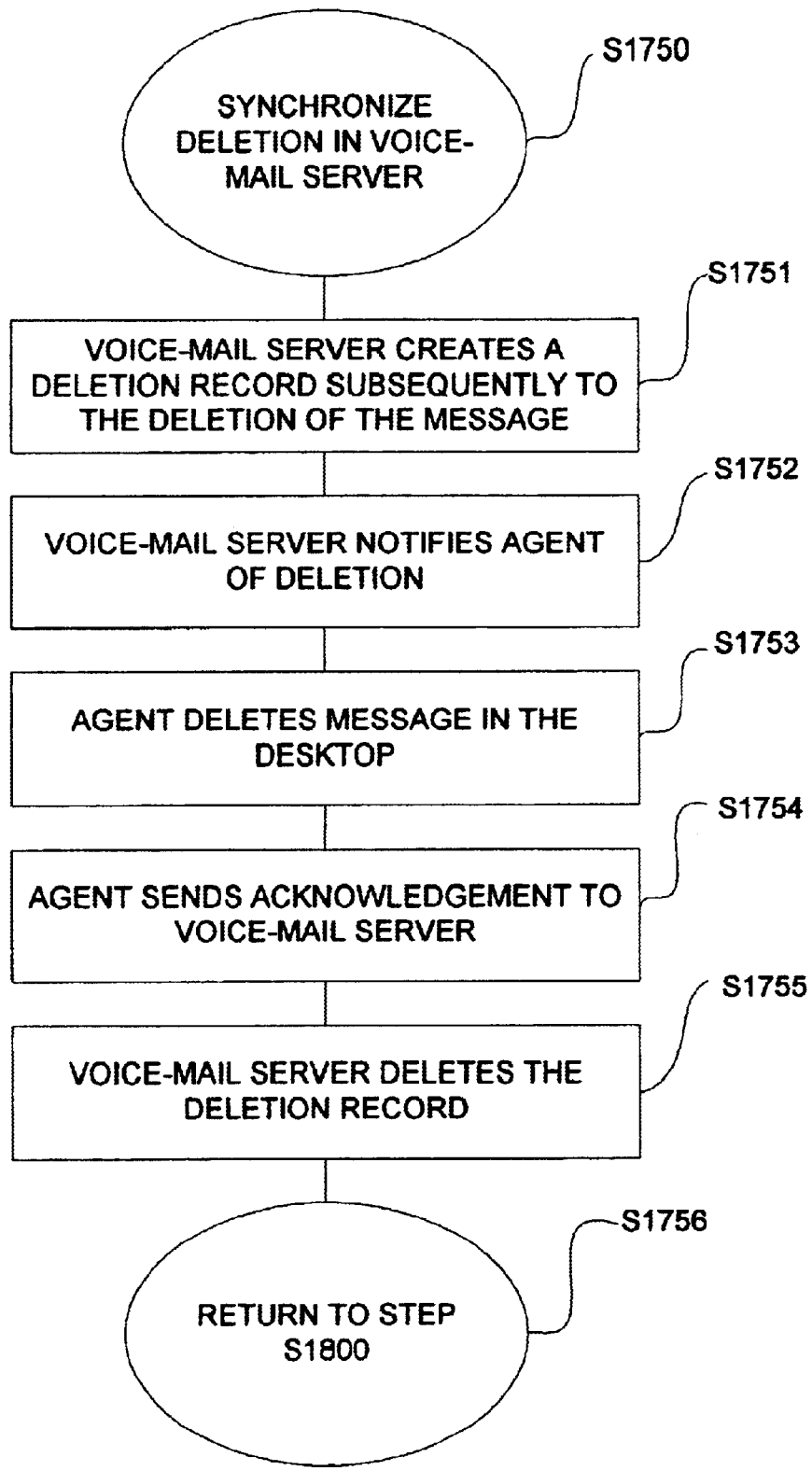
FIG. 22 is a flowchart showing the "synchronize deletion in voice-mail server" step of FIG. 20 in accordance with the system and method of the invention.

It should be recognized that if the process is shown in FIG. 18 is interrupted subsequent to either of steps S750–S754, the agent will attempt to synchronize the message at the next pass since the message is still marked as not synchronized. It should be recognized that this is also true if the agent is interrupted in the steps of FIG. 19. Similarly, the voice-mail server will attempt to synchronize until successful in the process as shown in FIGS. 21 and 22, as described below.

Figure 19:
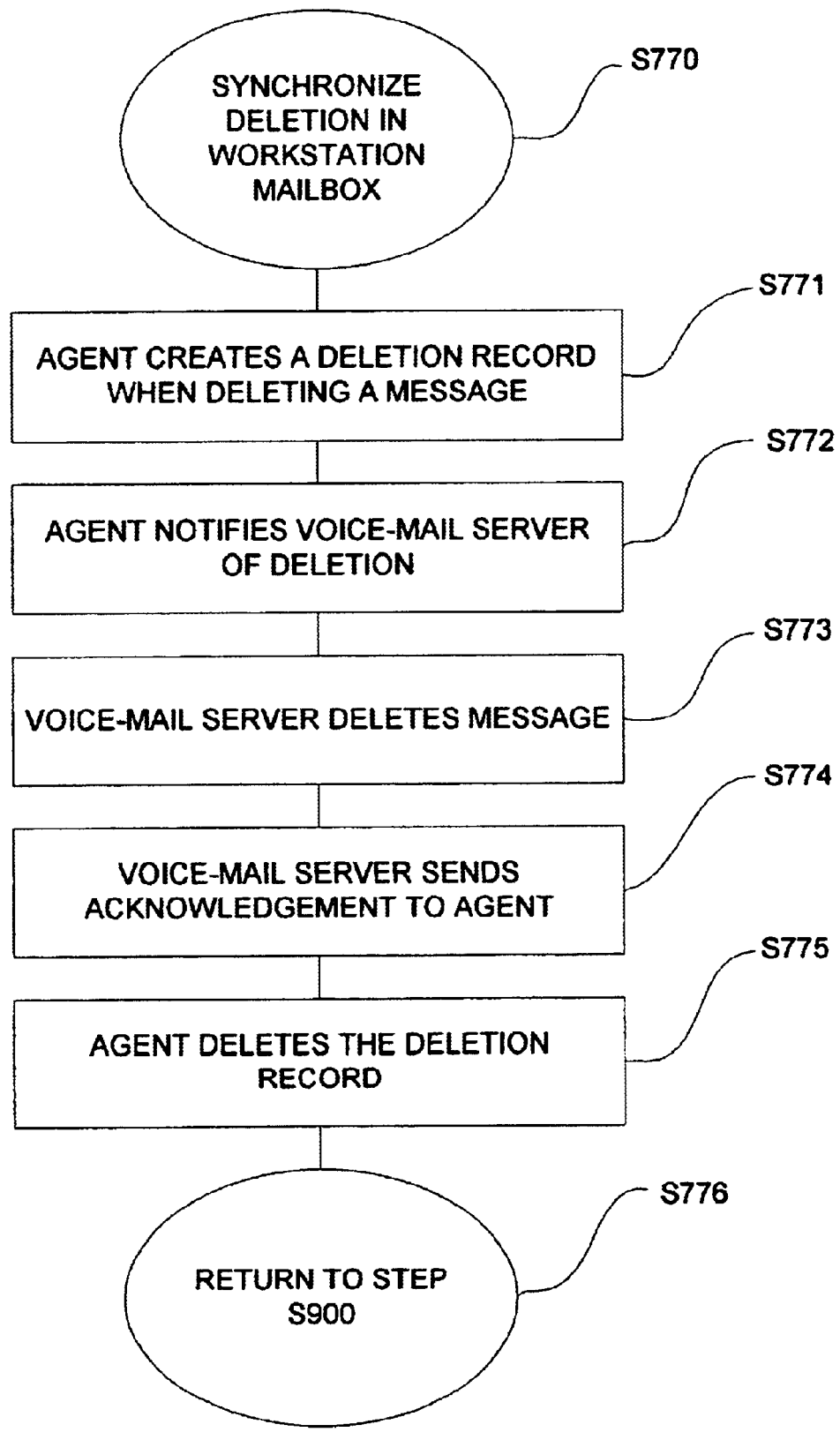
FIG. 19 is a flowchart showing the "synchronize deletion in mailbox" step of FIG. 16 in accordance with the system and method of the invention.

FIG. 19 shows in further detail the "synchronize deletion in workstation mailbox" step S770 of FIG. 16. The process of FIG. 19 starts in step S770. Then control passes to step S771. In step S771, the agent creates a deletion record when detecting a deletion of a message. Then, in step S772, the agent notifies the voice-mail server of the deletion. Then control passes to step S773.

In step S773, the voice-mail server deletes the message. Then, in step S774, the voice-mail server sends acknowledgement to the agent. Then control passes to step S775.

In step S775, the agent deletes the deletion record. The, control passes to step S776. In step S776, the process returns to step S900 in FIG. 16.

Figure 20:
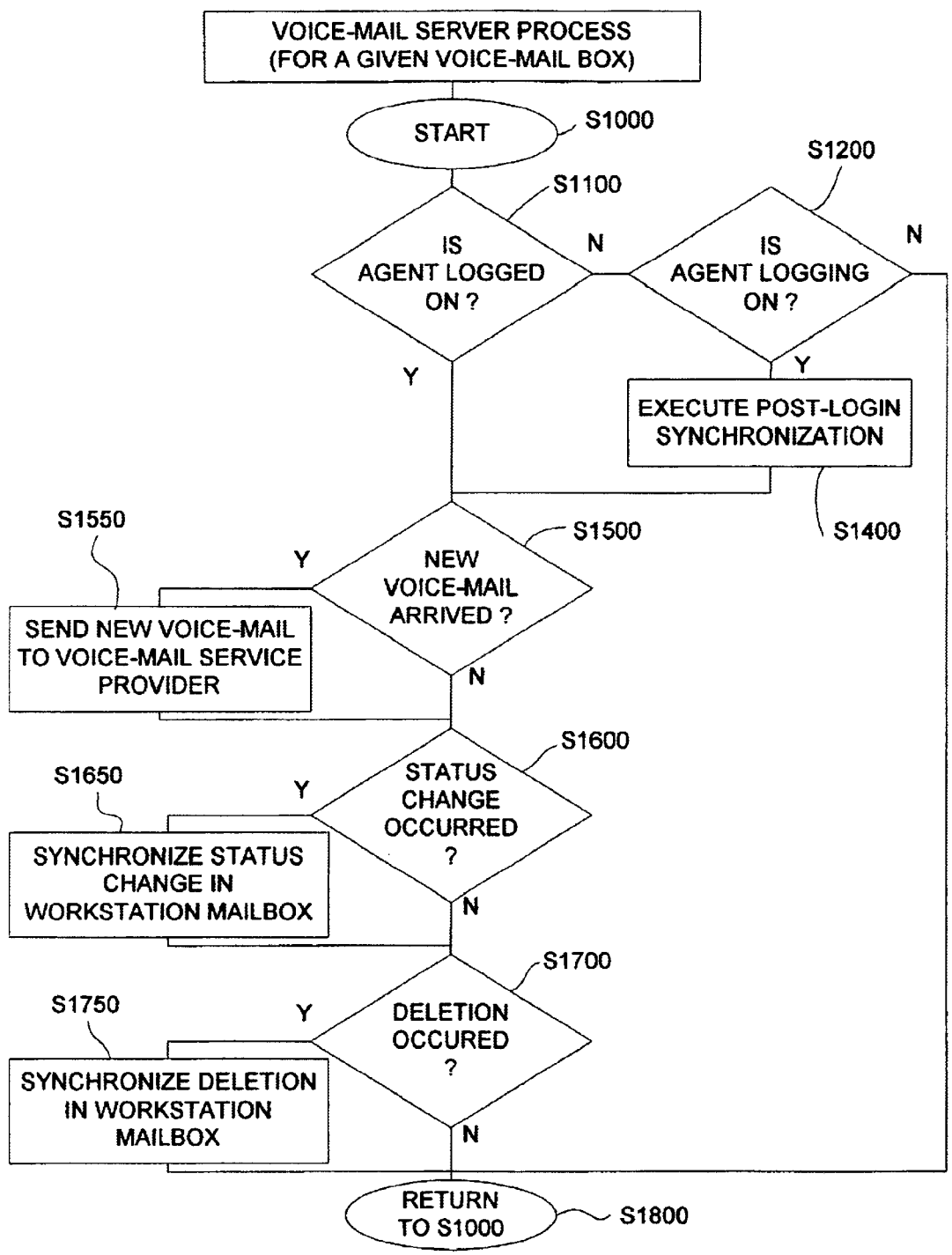
FIG. 20 is a flowchart showing operation of the voice-mail server in accordance with aspects of the system and method of the invention.

FIG. 20 is a flowchart showing aspects of the process performed by the voice-mail server for a given voice-mail box, in accordance with the system and method of the invention. As shown in FIG. 20, the process starts at S1000. Then, at step S1100, a determination is made whether the agent is logged onto the voice-mail server. If no, then the process passes to step S 1200 to determine if the agent is logging on, and if yes, in step S1200, then the process passes to step S1400. In step S1400, the post-login synchronization is performed by the voice-mail server. Then the process passes to step S11500. Alternatively, if the agent is logged on in step S1100, then the process passes directly to step S1500. If no in step S1200, the process passes to step S1800.

In step S1500, a determination is made whether a new voice-mail has arrived. If yes, then the process passes to step S1550. In step S1550, the new voice-mail is sent to the voice-mail service provider. Then, the process passes to step S1600. Alternatively, if a new voice-mail has not arrived in step S1500, then the process passes directly to step S1600.

In step S1600, a determination is made whether the status of a message has changed in the voice-mail server. If yes, then the process passes to step S1650. In step S1650, the status change is synchronized with the workstation mailbox. Then, the process passes to step S1700. Alternatively, if a status change has not occurred in the voice-mail server, then the process passes directly to step S1700.

In step S1700, a determination is made whether a deletion has occurred in the voice-mail server. If yes, then the process passes to step S1750. In step S1750, the deletion is synchronized with the workstation mailbox. Then, the process passes to step S1800. Alternatively, if a deletion has not occurred in the voice-mail server, then the process passes directly to step S1800.

In step S1800, the process returns to step S1000.

FIG. 21 shows in further detail the "synchronize status change in voice-mail server" step S1650 of FIG. 20. As shown in FIG. 21, the process starts in step S1650. Control then passes to step S1651. In step S1651, the voice-mail server marks the message in the voice-mail server as not synchronized. Then in step S1652, the voice-mail server notifies the agent of the new status of the message. Then control passes to step S1653.

In step S1653, the agent applies a new status to the workstation. Then, in step S1654, the agent sends acknowledgement to the voice-mail server. Control then passes to step S1655. In step 5655, the voice-mail server marks the message as synchronized. Then, control passes to step S1656. In step S1656, the process returns to step S1700 in FIG. 20.

FIG. 22 shows in further detail "synchronize deletion in voice-mail server" step S1750 of FIG. 20. The process of FIG. 22 starts in step S1750. Then control passes to step S1751. In step S1751, the voice-mail server creates a deletion record subsequently to the deletion of the message. Then, in step S1752, the voice-mail server notifies the agent of the deletion of the message. The process then passes to step S1753. In step S1753, the agent deletes the message in the workstation. Then, in step S1754, the agent sends acknowledgement of the deletion of the message to the voice-mail server. Then control passes to step S1755. In step S1755, the voice-mail server deletes the deletion record. Then, in step S1756, the process returns to step S1800 in FIG. 20.

Figure 23:
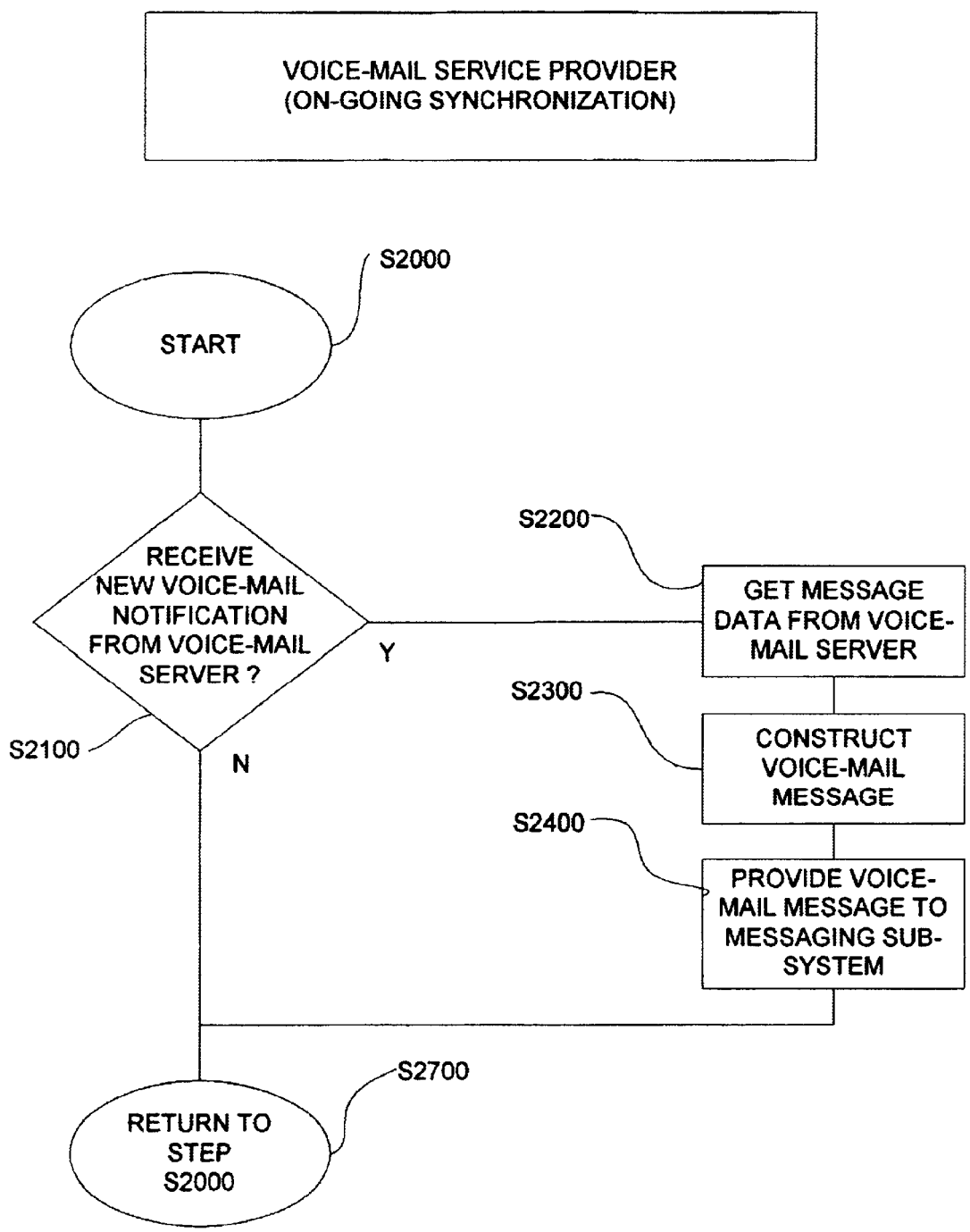
FIG. 23 is a flowchart showing operation of the voice-mail service provider during on-going synchronization in accordance with aspects of the system and method of the invention.

FIG. 23 illustrates further aspects of operation of the voice-mail service provider in accordance with the systems and method of the invention. Specifically, 23 illustrates operation of the voice-mail service provider which is located in the workstation. The process starts in step S2000. Then, in step S2100, a determination is made whether a new voice-mail notification has been received from the voice-mail server. If yes, then the voice-mail service provider obtains message data from the voice-mail server in step S2200. Then, in step S2300, the voice-mail service provider constructs the voice-mail message. Then, step S2400, the voice-mail service provider provides the voice-mail message to the messaging subsystem. The process then passes to step S2700.

Alternatively, in step S2100, if the voice-mail service provider did not receive a new voice-mail service notification from the voice-mail server, then the process passes to step S2700. In step S2700, the process returns to the start, i.e., to step S2000.

Figure 24:
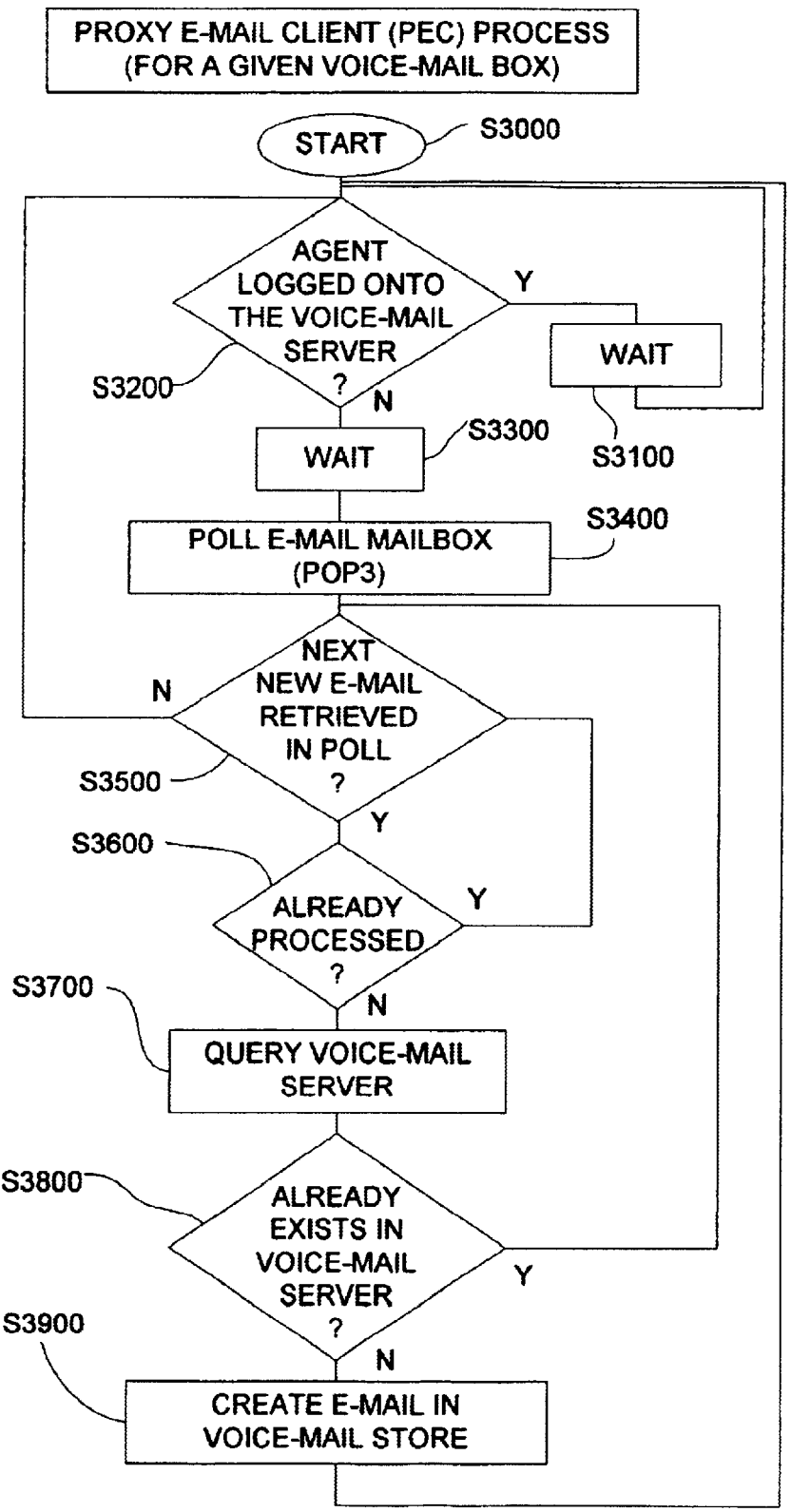
FIG. 24 is a flowchart showing operation of the proxy e-mail client (PEC) in accordance with aspects of the system and method of the invention.

FIG. 24 shows operation of the proxy e-mail client (PEC) for a given voice-mail box. As shown in FIG. 24, the process starts in step S3000. Then, the process passes to step S3200.

In step S3200, a determination is made whether the agent is logged onto the voice-mail server. If yes, the process passes to step S3100 in which the proxy e-mail client waits. Then, after waiting in step S3100, the process eventually returns to step S3200 to again check whether the agent is logged onto the voice-mail server.

If in step S3200, a determination is made that the agent is not logged onto the voice-mail server, then the process passes to step S3300. In accordance with this embodiment of the invention, the process waits in step S3300. Then, in step S3400, the proxy e-mail client polls the e-mail box for new messages. This may be formed by using a POP3 protocol, for example. Then the process passes to step S3500. In step S3500, it is determined whether a next new e-mail is retrieved in the poll. If no, then the process returns to step S3200.

Alternatively, if in step S3500, a next new e-mail is retrieved in the poll, then the process passes to step S3600. In step S3600, it is determined whether the next new e-mail was already processed. If yes, then the process returns to step S3500.

Alternatively, if in step S3600, the next new e-mail retrieved in the poll was not already processed, then the process passes to step S3700. In step S3700, the proxy e-mail client queries the voice-mail server to determine whether the next new e-mail retrieved in the poll already exists in the voice-mail message store. That is, in step S3800, a determination is made whether the next new e-mail retrieved in the poll already exists in the voice-mail message store. If yes, then the process returns to step S3500.

Alternatively, if no in step S3800, then the process passes to step S3900. In step S3900, the proxy e-mail client creates an e-mail in the message store. Then, the process returns to step S3200.

Accordingly, the invention provides various advantages. One advantage is that the location of the inbox is independent to accessibility to the inbox. In accordance with another aspect, the proxy e-mail client (PEC) is running when the workstation is not in communication with the voice-mail server to effectively retrieve e-mail messages.

As a result of the arrangement of the invention, various other advantages are provided in combination with other advantages. Voice-mail is available in the workstation in-basket as a result of the workstation retrieving duplicated voice-mails via the voice-mail service provider. E-mail is available in the voice-mail server, i.e., from the telephone (agent). On-going synchronization of messages between the workstation based mailbox and the voice-mail server based mailbox is provided due to the activities of the agent in the workstation and the voice-mail server). Post-login synchronization allows periods of disconnection between e-mail and voice-mail mailboxes. The post-login incremental synchronization process performed by the agent and voice-mail server allows each side to remember events and perform incremental synchronization, without scanning, using a system of message flags. Further, the system and method of the invention allow access to e-mails from the telephone without the workstation being involved, which is particularly useful for the mobile worker, through use of the proxy e-mail client (PEC).

Accordingly, while the present invention has been described herein in detail in relation to its exemplary embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims.

What is claimed is:

1. A messaging system for providing access to e-mail messages and voice-mail messages, the messaging system comprising:

a workstation that interfaces with a user, the workstation comprising:
an agent responsible for e-mail message replication and synchronization of both e-mail and voice-mail messages;
a voice-mail service provider responsible for voice-mail message replication and sending voice-mail messages;
an e-mail service provider for retrieving and sending e-mail messages;
a messaging sub-system for supporting the voice-mail service provider and the e-mail service provider, and
a workstation mailbox for storing messages, said agent monitoring message activity in the workstation mailbox, and said messaging sub-system delivering e-mail messages to the workstation mailbox;
a voice-mail server that sends and receives voice-mail messages, the voice-mail server comprising a voice-mail message store for storing messages, the voice-mail server responsible for voice-mail message and e-mail message replication, synchronization and storage in concert with the agent;
an e-mail server that sends and receives e-mail messages; and
a communication system variably connecting each of the workstation, the voice-mail server, and the e-mail server with each other;
wherein the voice-mail server receives a voice-mail message and stores the voice-mail message in the voice-mail message store, the voice-mail server communicates a copy of the voice-mail message to the voice-mail service provider, the voice mail service provider delivers the voice-mail message to the messaging subsystem that creates the voice-mail message in the workstation mailbox of the workstation.

2. The messaging system in accordance with claim 1, wherein the messaging system further comprising a proxy e-mail client that retrieves e-mail messages from the e-mail server.

3. The messaging system in accordance with claim 1, wherein the agent communicates a change in status of a message in the workstation mailbox to the voice-mail server.

4. The messaging system in accordance with claim 3, wherein the change in status of a message is at least one of message deleted, message read, and message new.

5. The messaging system in accordance with claim 4, wherein the status of the message in the workstation mailbox is message deleted, and the agent communicates the status of the message to the voice-mail server using a deletion record, the deletion record previously created when the deleted message was deleted.

6. The messaging system in accordance with claim 5, wherein the agent deletes the deletion record when acknowledgement of deletion is received from the voice-mail server.

7. The messaging system in accordance with claim 3, wherein the agent marks the message that changed in status as not synchronized, the agent notifies the voice-mail server of the changed status.

8. The messaging system in accordance with claim 7, wherein the voice-mail server sends acknowledgement of receipt of the change in status of the message to the agent, and agent marks the message as synchronized upon receipt of the acknowledgement.

9. The messaging system in accordance with claim 1, wherein the voice-mail communicates a change in status of a message in the voice-mail message store to the agent.

10. The messaging system in accordance with claim 9, wherein the change in status of a message is at least one of message deleted, message read, and message new.

11. The messaging system in accordance with claim 10, wherein the status of the message in the voice-mail message store is message deleted, and the voice-mail server communicates the status of the message to the agent using a deletion record, the deletion record previously created when the deleted message was deleted.

12. The messaging system in accordance with claim 11, wherein the voice-mail server deletes the deletion record when acknowledgement is received from the agent.

13. The messaging system in accordance with claim 9, wherein the voice-mail server marks the message that changed in status as not synchronized, the voice-mail server notifies the agent of the changed status.

14. The messaging system in accordance with claim 13, wherein the agent sends acknowledgment of receipt of the change in status of the message to the voice-mail server, the voice-mail server marks the message and synchronized upon receipt of the acknowledgement.

15. The messaging system in accordance with claim 1, wherein the agent monitors a change in status of a message in the workstation mailbox, the agent marking a message that has changed in status as not synchronized, when the workstation is operating and not in connection with the voice-mail server.

16. The messaging system in accordance with claim 15, wherein the agent communicates the stored change in status to the voice-mail server when the workstation gains connection with the voice-mail server.

17. The messaging system in accordance with claim 1, wherein the agent monitors a deletion of a message in the workstation mailbox, the agent creating a deletion record when the deletion occurs, when the workstation is operating and not in connection with the voice-mail server.

18. The messaging system in accordance with claim 1, wherein subsequent to the agent and the voice-mail server being not in communication, said agent and said voice-mail server establish communication, each of the agent and the voice-mail server performing incremental synchronization whereby only messages that have been changed prior to the establishment of communication are synchronized.

19. The messaging system in accordance with claim 18, wherein, the agent synchronizes messages with a status change in the workstation mailbox.

20. The messaging system in accordance with claim 18, wherein, the agent synchronizes messages that have been deleted in the workstation mailbox.

21. The messaging system in accordance with claim 18, wherein, the agent synchronizes new messages in the workstation mailbox.

22. The messaging system in accordance with claim 18 wherein, the voice-mail server synchronizes messages with a status change in the voice-mail message store.

23. The messaging system in accordance with claim 18, wherein, the voice-mail server synchronizes messages that have been deleted in the voice-mail message store.

24. The messaging system in accordance with claim 23, wherein, the voice-mail server synchronizing messages that have been deleted in the voice-mail message store includes the agent requesting confirmation from the user of deletion.

25. The messaging system in accordance with claim 18, wherein, the voice-mail server synchronizes new messages in the voice-mail message store.

26. A messaging system for providing access to e-mail messages and voice-mail messages, the messaging system comprising:
   a workstation that interfaces with a user, the workstation comprising:
      an agent responsible for e-mail message replication and synchronization of both e-mail and voice-mail messages;
      a voice-mail service provider responsible for voice-mail message replication and sending voice-mail messages;
      an e-mail service provider for retrieving and sending e-mail messages;
      a messaging sub-system for supporting the voice-mail service provider and the e-mail service provider, and
      a workstation mailbox for storing messages, said agent monitoring message activity in the workstation mailbox;
   a voice-mail server that sends and receives voice-mail messages, the voice-mail server comprising a voice-mail message store for storing messages, the voice-mail server responsible for voice-mail message and e-mail message replication and, synchronization of both e-mail messages and voice-mail messages in concert with the agent;
   an e-mail server that sends and receives e-mail messages; and
   a communication system variably connecting each of the workstation, the voice-mail server, and the e-mail server with each other;
   wherein a proxy e-mail client retrieves e-mail messages from the e-mail server when the agent is not logged on to the voice-mail server, the proxy e-mail client is inactive when the agent is logged on to the voice-mail server;

and wherein the voice-mail server communicates with the workstation to determine if the workstation is in connection with the voice-mail server, the voice-mail server activating the proxy e-mail receiver if the voice-mail server determines that the workstation is not in connection.

27. The messaging system in accordance with claim 26, wherein the proxy e-mail client retrieves a voice-mail server retrieved e-mail by polling the e-mail server.

28. The messaging system in accordance with claim 27, wherein the proxy e-mail client maintains a history of e-mail messages processed in order to only process new messages at each poll.

29. The messaging system in accordance with claim 26, wherein the proxy e-mail client retrieves a voice-mail server retrieved e-mail by receiving forwarded copies of the e-mail messages from the e-mail server.

30. The messaging system in accordance with claim 29, wherein the agent queries the voice-mail server to determine whether the new e-mail was previously retrieved by the proxy e-mail client when the agent was not in communication with the voice-mail server.

31. The messaging system in accordance with claim 30, wherein if the new e-mail was previously retrieved by the proxy e-mail client, then the voice-mail server communicates back to the agent the status of the e-mail, the agent then applying the status of the e-mail to the message in the workstation mailbox.

32. The messaging system in accordance with claim 30, wherein if the new e-mail was not previously retrieved by the proxy e-mail client, then the agent communicates a copy of the new e-mail message to the voice-mail server.

33. A messaging system for providing access to e-mail messages and voice-mail messages, the messaging system comprising:
   a workstation that interfaces with a user, the workstation comprising:
      an agent responsible for e-mail message replication and synchronization of both e-mail and voice-mail messages;
      a voice-mail service provider responsible for voice-mail message replication and sending voice-mail messages;
      an e-mail service provider for retrieving and sending e-mail messages;
      a messaging sub-system for supporting the voice-mail service provider and the e-mail service provider; and
      a workstation mailbox for storing messages, said agent monitoring message activity in the workstation mailbox, and said messaging sub-system delivering e-mail messages to the workstation mailbox;
   a voice-mail server that sends and receives voice-mail messages, the voice-mail server comprising a voice-mail message store for storing messages, the voice-mail server responsible for voice-mail message and e-mail message replication, synchronization and storage in concert with the agent;
   an e-mail server that sends and receives e-mail messages; and
   a communication system variably connecting each of the workstation, the voice-mail server, and the e-mail server with each other;
wherein when the agent detects the arrival of a new e-mail message in the workstation mail box, the agent communicates a copy of the e-mail message to the voice-mail server for storage.

34. A messaging system for providing access to e-mail messages and voice-mail messages, the messaging system comprising:
   a workstation that interfaces with a user, the workstation comprising:
      an agent responsible for e-mail message replication and synchronization of both e-mail and voice-mail messages;
      a voice-mail service provider responsible for voice-mail message replication and sending voice-mail messages.
      an e-mail service provider for retrieving and sending e-mail messages;
      a messaging sub-system for supporting the voice-mail service provider and the e-mail service provider, and
      a workstation mailbox for storing messages, said agent monitoring message activity in the workstation mailbox;
   a voice-mail server that sends and receives voice-mail messages, the voice-mail server comprising a voice-mail message store for storing messages, the voice-mail server responsible for voice-mail message and e-mail message replication and, synchronization of both e-mail messages and voice-mail messages in concert with the agent:
   an e-mail server that sends and receives e-mail messages; and
   a communication system variably connecting each of the workstation, the voice-mail server, and the e-mail server with each other;
wherein each of the agent and the voice-mail server perform message synchronization based on preference rules and wherein the preference rules dictate that between an old message and a new message, each of the old and new messages is synchronized to be an old message.

35. A messaging system for providing access to e-mail messages and voice-mail messages, the messaging system comprising:
   means for interfacing with a user comprising:
      means for e-mail message replication and synchronization of both e-mail and voice-mail messages;
      a voice-mail service provider responsible for voice-mail message replication and sending voice-mail messages;
      an e-mail service provider for retrieving and sending e-mail messages;
      a messaging sub-system for supporting the voice-mail service provider and the e-mail service provider, and
      a workstation mailbox for storing messages, said means for e-mail message replication and synchronization monitoring message activity in the workstation mailbox, and said messaging sub-system delivering e-mail messages to the workstation mailbox;
   means for sending and receiving e-mail messages; and
   means for sending and receiving voice-mail messages comprising a voice-mail message store for storing messages, the means for sending and receiving voice-mail messages responsible for voice-mail message and e-mail message replication, synchronization and storage in concert with the means for e-mail message replication and synchronization; and
   means for variably connecting each of the means for interfacing, the means for sending and receiving voice-mail messages, and the means for sending and receiving e-mail messages with each other;
wherein when the means for sending and receiving voice-mail messages receives a voice-mail message and stores the voice-mail message in the voice mail message store, the means for sending and receiving voice-mail messages communicates a copy of the voice-mail to the voice-mail service provider, the voice-mail service provider delivers the voice-mail message to the message subsystem that creates the voice-mail message in the workstation mailbox.

36. A method for providing access to e-mail messages and voice-mail messages, the method comprising the steps of:

providing a workstation that interfaces with a user, the workstation comprising:
- an agent responsible for e-mail message replication and synchronization of both e-mail and voice-mail messages;
- a voice-mail service provider responsible for voice-mail message replication and sending voice-mail messages;
- an e-mail service provider for retrieving and sending e-mail messages;
- a messaging sub-system for supporting the voice-mail service provider and the e-mail service provider, and
- a workstation mailbox for storing messages, said agent monitoring message activity in the workstation mailbox and said messaging sub-system delivering e-mail messages to the workstation mailbox;

providing a voice-mail server that sends and receives voice-mail messages, the voice-mail server comprising a voice-mail message store for storing messages, the voice-mail server responsible for voice-mail message and e-mail message replication, synchronization and storage in concert with the agent;

providing an e-mail server that sends and receives e-mail messages; and providing a communication system variably connecting each of the workstation, the voice-mail server, and the e-mail server with each other;

wherein when the agent detects the arrival of a new e-mail message in the workstation mail box, the agent communicates a copy of the e-mail message to the voice-mail server for storage.

* * * * *

UNITED STATES PATENT AND TRADEMARK OFFICE
CERTIFICATE OF CORRECTION

PATENT NO.     : 6,792,085 B1
DATED          : September 14, 2004
INVENTOR(S)    : Rigaldies et al.

It is certified that error appears in the above-identified patent and that said Letters Patent is hereby corrected as shown below:

Column 4,
Line 24, delete "Is"

Column 15,
Line 26, delete "lo"

Column 19,
Line 3, "10" should be -- 110 --

Column 26,
Line 21, "S11500" should be -- S1500 --
Line 56, "5655" should be -- S1655 --

Signed and Sealed this

Second Day of November, 2004

JON W. DUDAS
*Director of the United States Patent and Trademark Office*